US009594532B2

(12) United States Patent
Kim

(10) Patent No.: US 9,594,532 B2
(45) Date of Patent: Mar. 14, 2017

(54) ELECTRONIC APPARATUS, MANAGEMENT SERVER, IMAGE FORMING APPARATUS FOR DETERMINING A RESOURCE APPARATUS MOVED AND SELECTING CLOSEST IMAGE FORMING APPARATUS BY COMPARING RECEIVED NEIGHBOR ACCESS POINTS INFORMATION WITH RETRIEVED ACCESS POINTS INFORMATION

(71) Applicant: Samsung Electronics Co., Ltd., Suwon-si (KR)

(72) Inventor: Hye-soo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/477,359

(22) Filed: Sep. 4, 2014

(65) Prior Publication Data
US 2015/0277809 A1 Oct. 1, 2015

(30) Foreign Application Priority Data
Apr. 1, 2014 (KR) .................. 10-2014-0038457

(51) Int. Cl.
*G06F 3/12* (2006.01)
*H04W 4/04* (2009.01)
*H04W 84/12* (2009.01)

(52) U.S. Cl.
CPC ............ *G06F 3/126* (2013.01); *G06F 3/1204* (2013.01); *G06F 3/1226* (2013.01);
(Continued)

(58) Field of Classification Search
None
See application file for complete search history.

(56) References Cited

U.S. PATENT DOCUMENTS

2005/0066072 A1\* 3/2005 Nakamura ............ G06F 3/1203
710/8
2006/0046709 A1 3/2006 Krumm et al.
(Continued)

FOREIGN PATENT DOCUMENTS

KR 1020030094729 \* 12/2003
WO 2004/088936 10/2004

OTHER PUBLICATIONS

Machine translation of KR1020030094729 to Park et al.\*
Extended European Search Report dated Sep. 3, 2015 in European Patent Application No. 15161508.5.

*Primary Examiner* — Benny Q Tieu
*Assistant Examiner* — Haris Sabah
(74) *Attorney, Agent, or Firm* — Staas & Halsey LLP

(57) ABSTRACT

An electronic apparatus is disclosed. An electronic apparatus may include a communications interface configured to retrieve accessible access points and receive information of neighbor access points of each of the plurality of image forming apparatuses; a selector configured to select an image forming apparatus that is nearest neighbor to the electronic apparatus among the plurality of image forming apparatuses by comparing each of the received information of a plurality of neighbor access points with the retrieved access points; a printer driver configured to generate printing data for a document; and a control configured to control the communications interface to transmit the generated printing data to the selected image forming apparatus.

19 Claims, 22 Drawing Sheets

(52) U.S. Cl.
CPC .......... *G06F 3/1231* (2013.01); *G06F 3/1292* (2013.01); *H04W 4/043* (2013.01); *H04W 84/12* (2013.01)

(56) References Cited

U.S. PATENT DOCUMENTS

| | | | |
|---|---|---|---|
| 2006/0268319 A1* | 11/2006 | Winkel et al. | 358/1.15 |
| 2009/0273801 A1* | 11/2009 | Steele et al. | 358/1.15 |
| 2012/0038948 A1* | 2/2012 | Park | 358/1.15 |
| 2013/0077568 A1* | 3/2013 | Mizutani | H04W 36/0083 370/328 |

* cited by examiner

FIG. 6

| PRINTER 1 Info. (1.1.1.1) | | | PRINTER 2 Info. (1.1.1.2) | | |
|---|---|---|---|---|---|
| SSID | BSID | RSSI | SSID | BSID | RSSI |
| AP_A | 00:AA | -10dB | AP_B | 00:BB | -10dB |
| AP_B | 00:BB | -50dB | AP_A | 00:AA | -60dB |

FIG. 7

| Laptop Info. (IP:1.1.2.1) | | PRINTER 1 Info. (IP:1.1.1.1) | | PRINTER 2 Info. (IP:1.1.1.2) | |
|---|---|---|---|---|---|
| SSID | RSSI | SSID | RSSI | SSID | RSSI |
| AP_A | -20dB | AP_A | -10dB | AP_B | -10dB |
| AP_B | -40dB | AP_B | -50dB | AP_A | -60dB |

FIG. 8

| Index | BSID(Mobile) | RSSI(dBm) | BSID(Printer1) | RSSI(dBm) | Diff_w_Mobile | BSID(Printer2) | RSSI(dBm) | Diff_w_Mobile |
|---|---|---|---|---|---|---|---|---|
| 1 | 10 | -53 | 10 | -48 | -5 | 10 | -46 | -7 |
| 2 | 12 | -53 | 12 | -50 | -3 | 12 | -45 | -8 |
| 3 | 13 | -53 | 13 | -48 | -5 | 13 | -43 | -10 |
| 4 | 34 | -63 | 34 | -65 | 2 | | | |
| 5 | 0B2 | -65 | 0B2 | -60 | -5 | | | |
| 6 | 1D | -57 | 1D | -49 | -8 | 1D | -50 | -7 |
| 7 | 1F | -55 | 1F | -50 | -5 | 1F | -50 | -5 |
| 8 | 0B3 | -65 | 0B3 | -65 | 0 | | | |
| 9 | C0 | -64 | C0 | -61 | -3 | C0 | -63 | -1 |
| 10 | C4 | -60 | | | | | | |
| 11 | E0 | -65 | | | | | | |
| 12 | ED | -70 | ED | -68 | -2 | ED | -69 | -1 |
| 13 | EF | -68 | EF | -69 | 1 | EF | -68 | 0 |
| 14 | F8 | -42 | F8 | -38 | -4 | F8 | -50 | 8 |
| | | | Probability | AVG | -3.08 | Probability | AVG | -3.44 |
| | | | 85.71% | STDEV | 2.91 | 64.29% | STDEV | 5.55 |

FIG. 12

| PROXIMITY | MODEL | POSITION | IP ADDRESS | MAC ADDRESS |
|---|---|---|---|---|
| ▂▄▆ | Samsung CLX-4190 Series | P#TF Room 1 | 10.88.180.53 | 00:15:99:A8... |
| ▂▄ | Samsung CLX-4190 Series | P#TF Room 2 | 10.88.180.48 | 00:15:99:9B... |

RETRIEVE PRINTER
RETRIEVAL COMPLETION
RE-RETRIEVAL
OK  CANCEL

FIG. 14

※ CALENDAR SERVICE UTILIZING META SUCH
AS PRINTING POSITION, TIME, ETC

| @ SCHEDULE-Samsung mySingle - Windows Internet Explorer | | | | | | □■⊠ |
|---|---|---|---|---|---|---|
| [PRINT][REFRESH] | | ◁ 2013.10 ▷ | [DAILY][WEEKLY][MONTHLY][LIST] | | | |
| RETRIEVE BY CONFERENCE PLACE | | THIRTY-THREE FLOOR | | | | |
| 6 | 7 | 8 | 9 | 10 | 11 | 12 |
| 13 | 14 | 15 | 16 | 17 | 18 | 19 |
| 20 | 21 | 22 | 23 | 24 | 25 | 26 |
| 27 | 28 | 29 | 30 | 31 | 11/1 | 2 |

- REVIEW CHAMPION
- 10/21 10:00 AM
- P#2_2nd_Report_v0.9.ppt
- TWENTIETH FLOOR, IDEA ROOM III III

- ANNOUNCEMENT OF BUSINESS MANAGER
- 10/23 09:00 AM
- #2_2nd_Report_v1.0.ppt
- THIRTY-THIRD FLOOR, CONFERENCE ROOM A

FIG. 16

| Name | IP | Location | Adj Printer | Status | Pre. Location |
|---|---|---|---|---|---|
| PRINTER 1 | 1.1 | R4 33 | Adj. PRINTER 2 | Move | R3 20 |
| PRINTER 2 | 1.2 | R4 33 | Adj. PRINTER 1 | - | |

ELECTRONIC APPARATUS, MANAGEMENT SERVER, IMAGE FORMING APPARATUS FOR DETERMINING A RESOURCE APPARATUS MOVED AND SELECTING CLOSEST IMAGE FORMING APPARATUS BY COMPARING RECEIVED NEIGHBOR ACCESS POINTS INFORMATION WITH RETRIEVED ACCESS POINTS INFORMATION

CROSS-REFERENCE TO RELATED APPLICATIONS

This application claims the priority benefit from Korean Patent Application No. 10-2014-0038457, filed on Apr. 1, 2014, in the Korean Intellectual Property Office, the disclosure of which is incorporated herein by reference in its entirety.

BACKGROUND

1. Field

Embodiments relate to an electronic apparatus, a management server, an image forming system, and a method for controlling a printing, and more particularly, to an electronic apparatus capable of performing a printing with an image forming apparatus which is positioned to be neighbor to the electronic apparatus among a plurality of image forming apparatuses connected to a network, a management server, and a method for controlling a printing.

2. Description of the Related Art

In general, an image forming apparatus refers to an apparatus to print printing data generated from a terminal such as a computer on a recording paper. An example of the image forming apparatus may include a copy machine, a printer, a facsimile, a multi function peripheral (MFP) complexly implementing the above-mentioned functions via a single apparatus, or the like.

In a general network printing method, a user selects the image forming apparatus on a network in which a printing job is to be performed and transmits the printing data to the selected image forming apparatus, such that the printing is performed.

However, in a case in which the network connected to the user is not the network which was conventionally used by the user but a new network, it was difficult for the user to determine what image forming apparatus he or she should use to perform the printing.

Accordingly, in a case in which the printing job should be performed under a new network environment, a method capable of easily selecting the image forming apparatus to perform the printing job has been demanded.

SUMMARY

Exemplary embodiments may overcome the above disadvantages and other disadvantages not described above. Also, exemplary embodiments are not required to overcome the disadvantages described above, and an exemplary embodiment may not overcome any of the problems described above.

One or more embodiments may provide an electronic apparatus capable of performing a printing with an image forming apparatus which is positioned to be neighbor to the electronic apparatus among a plurality of image forming apparatuses connected to a network, a management server, and a method for controlling a printing.

According to an aspect of one or more embodiments, there is provided an electronic apparatus which includes a communications interface configured to retrieve accessible access points and receive information of neighbor access points of each of the plurality of image forming apparatuses; a selector configured to select an image forming apparatus that is nearest neighbor to the electronic apparatus among the plurality of image forming apparatuses by comparing each of the received information of a plurality of neighbor access points with the retrieved access points; a printer driver configured to generate printing data for a document; and a controller configured to control the communications interface to transmit the generated printing data to the selected image forming apparatus.

The communications interface may receive the information of the neighbor access points from each of the plurality of image forming apparatuses.

The communications interface may receive the information of the neighbor access points of each of the plurality of image forming apparatuses from a management server having the information of the neighbor access points of each of the plurality of image forming apparatuses.

The selector may calculate proximity between each of the plurality of image forming apparatuses and the electronic apparatus by comparing the received information of the plurality of neighbor access points with the retrieved access points, and the electronic apparatus may further include a user interface configured to display the proximity between each of the plurality of image forming apparatuses and the electronic apparatus and to select one of the displayed image forming apparatuses.

The selector may select an image forming apparatus that is nearest neighbor to the electronic apparatus depending on whether or not the retrieved access points for the electronic apparatus are included in the received information of the neighbor access points.

The selector may select an image forming apparatus that is nearest neighbor to the electronic apparatus by comparing the retrieved access points of the electronic apparatus and each of the plurality of image forming apparatuses, and received signal strength indicators of the access points with one another.

The selector may transmit the retrieved access points to 'a management server having the information of the neighbor access points of each of the plurality of image forming apparatuses' and receive information of an image forming apparatus that is nearest neighbor to the electronic apparatus from the management server.

The controller may request a printer driver to the management server and install the printer driver if the printer driver corresponding to the selected image forming apparatus is not installed.

The communications interface may receive at least one of service set identifier (SSID), basic set identifier (BSID), and received signal strength indicator (RSSI) of each of the accessible access points.

The electronic apparatus may further include a user interface configured to display a list of other image forming apparatuses that are neighbors to the selected image forming apparatus and select one of other displayed image forming apparatuses if an error for the selected image forming apparatus is detected, wherein the communications interface may transmit controlling instructions allowing printing data which is pre-transmitted to a newly selected another image forming apparatus to be transmitted to the selected image forming apparatus.

According to an aspect of one or more embodiments, there is provided a management server which includes a communications interface configured to receive information of accessible access points of the electronic apparatus and each of the plurality of image forming apparatuses; a position manager configured to select an image forming apparatus that is nearest neighbor to the electronic apparatus among the plurality of image forming apparatuses by comparing the received information of each of a plurality of neighbor access points with the received access points of the electronic apparatus; and a controller configured to control the communications interface to transmit information on the selected image forming apparatus to the electronic apparatus.

The position manager may select an image forming apparatus that is nearest neighbor to the electronic apparatus depending on whether or not the access points of the electronic apparatus are included in the information of the accessible access points of the image forming apparatus.

The position manager may select the image forming apparatus that is nearest neighbor to the electronic apparatus by comparing the retrieved access points of the electronic apparatus and each of the plurality of image forming apparatuses, and received signal strength indicators of the retrieved access points with one another.

The management server may further include: a storage configured to store the received information of the accessible access points of each of the plurality of image forming apparatus; and an apparatus manager configured to detect whether or not the image forming apparatus is moved by comparing the stored information of the access points with the received information of the accessible access points.

The management server may further include a storage configured to store a printer driver corresponding to each of the plurality of image forming apparatuses, wherein the controller may transmit the printer driver corresponding to the selected image forming apparatus together with the information of accessible access points.

According to an aspect of one or more embodiments, there is provided an image forming system which includes: an electronic apparatus configured to generate printing data for a document; a plurality of image forming apparatuses configured to perform a printing job using the generated printing data; and a management server configured to determine an image forming apparatus that is nearest neighbor to the electronic apparatus among the plurality of image forming apparatuses by comparing accessible access points for the electronic apparatus with accessible access points for each of the plurality of image forming apparatuses and allowing the generated printing data to be printed in the determined image forming apparatus.

According to an aspect of one or more embodiments, there is provided a method for controlling a printing of an electronic apparatus which includes: retrieving accessible access points; selecting an image forming apparatus that is nearest neighbor to the electronic apparatus among the plurality of image forming apparatuses by comparing the retrieved access points with information of neighbor access points of the plurality image forming apparatuses; generating printing data for a document; and transmitting the generated printing data to the selected image forming apparatus.

In the selecting operation, the image forming apparatus that is nearest neighbor to the electronic apparatus may be selected depending on whether or not the retrieved access points in the electronic apparatus are included in the information of the neighbor access points.

In the selecting operation, the image forming apparatus that is nearest neighbor to the electronic apparatus may be selected by comparing the retrieved access points of the electronic apparatus and each of the plurality of image forming apparatuses, and received signal strength indications of the access points with one another.

According to an aspect of one or more embodiments, there is provided a method for controlling a printing of a management server connected to an electronic apparatus and a plurality of image forming apparatuses includes: receiving information of accessible access points of the electronic apparatus and each of the plurality of image forming apparatuses; selecting one image forming apparatus that is nearest neighbor to the electronic apparatus among the plurality of image forming apparatuses by comparing accessible access points in the electronic apparatus with accessible access points in each of the plurality of image forming apparatuses; and transmitting information on the selected image forming apparatus to the electronic apparatus.

In the selecting operation, the image forming apparatus that is nearest neighbor to the electronic apparatus is selected depending on whether or not the retrieved access points for the electronic apparatus are included in the information of the neighbor access points.

In the selecting operation, the image forming apparatus that is nearest neighbor to the electronic apparatus is selected by comparing the retrieved access points of the electronic apparatus and each of the plurality of image forming apparatuses, and received signal strength indicators of the access points with one another.

According to an aspect of one or more embodiments, there is provided a method for controlling a printing of a management server connected to an electronic apparatus and a plurality of image forming apparatuses, the method includes receiving information of accessible access points of the electronic apparatus and each of the plurality of image forming apparatuses; selecting an image forming apparatus that is nearest neighbor to the electronic apparatus among the plurality of image forming apparatuses by comparing accessible access points for the electronic apparatus with accessible access points for each of the plurality of image forming apparatuses; and transmitting information on the selected image forming apparatus to the electronic apparatus.

In an aspect of one or more embodiments, there is provided at least one non-transitory computer readable medium storing computer readable instructions which when executed implement methods of one or more embodiments.

BRIEF DESCRIPTION OF THE DRAWINGS

The above and/or other aspects will be more apparent by describing certain exemplary embodiments with reference to the accompanying drawings, in which:

FIG. 6 is a diagram showing an example of information of neighbor access points stored by the management server of FIG. 4;

FIG. 7 is a diagram for describing a first example selecting a neighbor image forming apparatus by using the stored information of the neighbor access points;

FIG. 8 is a diagram for describing a second example selecting a neighbor image forming apparatus by using the stored information of the neighbor access points;

FIG. 12 is a diagram showing an example of a user interface window which may be displayed on an electronic apparatus of FIG. 11;

FIGS. 13 and 14 are block diagrams showing an operation example of a management server of FIG. 1;

FIG. 16 is a diagram showing an example of management information stored in a storing unit of the management server;

DETAILED DESCRIPTION

Figure 1:
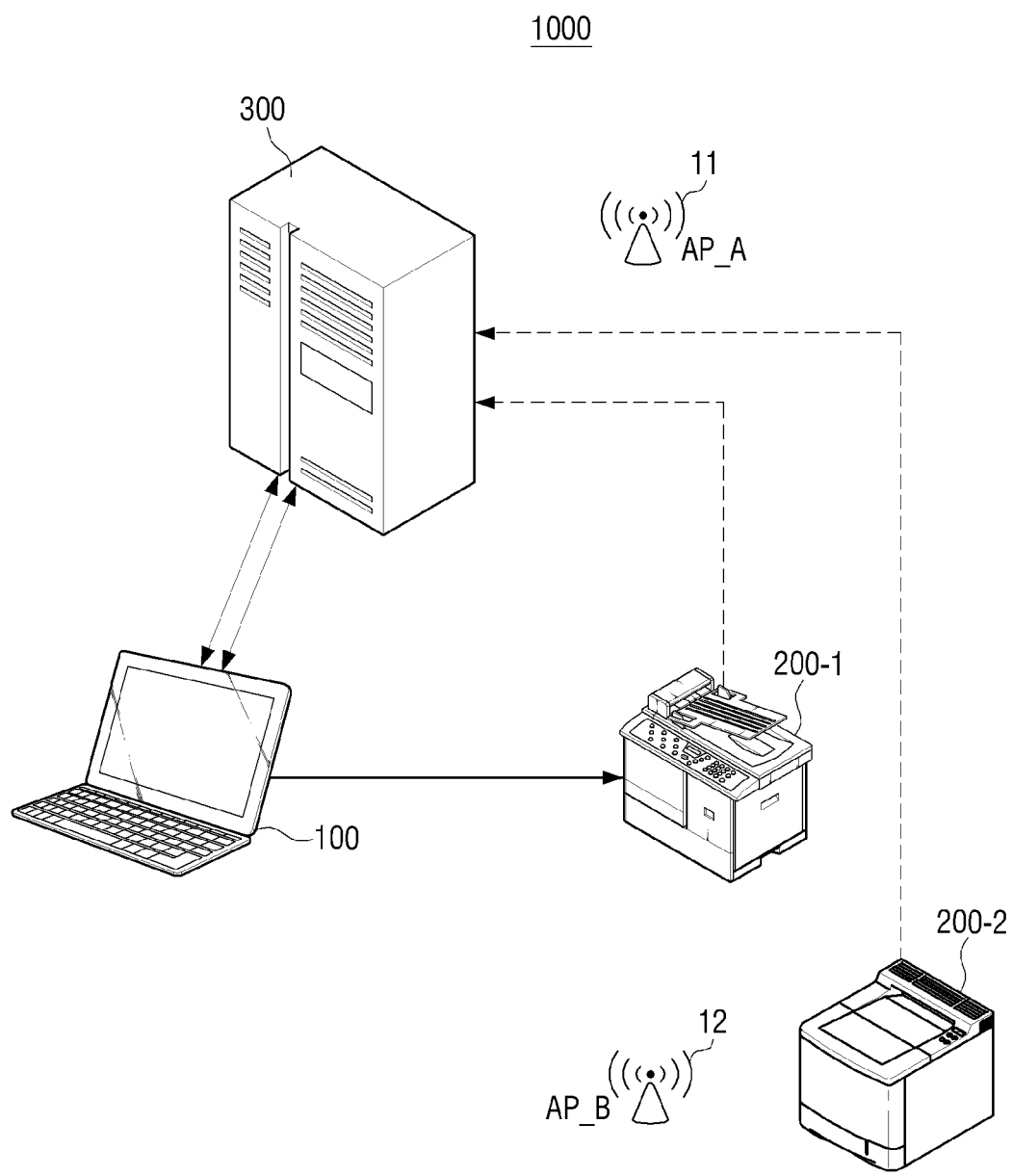
FIG. 1 is a block diagram showing an image forming system according to an exemplary embodiment.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 is a block diagram showing an image forming system according to an exemplary embodiment.

Referring to FIG. 1, an image forming system 1000 includes an electronic apparatus 100, a plurality of image forming apparatuses 200-1 and 200-2, and a management server 300.

The electronic apparatus 100 generates printing data about a document. In addition, the electronic apparatus 100 detects whether or not a network environment is changed and selects an image forming apparatus that is nearest neighbor thereto in one or more embodiments in which the network environment is changed. In addition, the electronic apparatus 100 transmits the generated printing data to the nearest neighbor image forming apparatus. A detailed configuration and operation of the electronic apparatus 100 will be described below with reference to FIG. 2. The electronic apparatus 100 may be desk computers, notebooks, tablets, mobile phones, PMP, MP3 player, and the like.

Each of the plurality of image forming apparatuses 200-1 and 200-2 is connected to the electronic apparatus 100 and the management server 300 via the network. Each of the plurality of image forming apparatuses 200-1 and 200-2 retrieves access points (APs) 11 and 12 (or wireless access points, hereinafter, referred to as an access point) to which it is accessible and provides information on the retrieved access points 11 and 12 to the management server 300 or the electronic apparatus 100. In addition, the plurality of image forming apparatuses 200-1 and 200-2 receive the printing data from the electronic apparatus 100 and print the received printing data. A detailed configuration and operation of the image forming apparatus will be described below with reference to FIG. 3. The image forming apparatus 200 may be a multi function peripheral (MFP) capable of performing functions of scan, copy, and the like as well as a printer capable of performing only a printing job.

The management server 300 is connected to the electronic apparatus 100 and the image forming apparatus 200 via a network. In addition, the management server 300 determines the image forming apparatus in which the printing data generated from the electronic apparatus 100 is to be printed. That is, the management server 300 may determine the image forming apparatus that is nearest neighbor to the electronic apparatus 100. In addition, the management server 300 may manage a printing history of the electronic apparatus 100 and a position of each of the plurality of image forming apparatuses 200-1 and 200-2.

In addition, the management server 300 determines a reservoir in which the printing data generated from the electronic apparatus 100 is to be stored. In addition, the management server 300 may control the image forming apparatus 200 so that the generated printing data is stored in the determined reservoir until the corresponding printing data is printed. In addition, if the generated printing data is printed, the management server 300 may cause the reservoir in which the corresponding printing data is stored to delete the corresponding printing data. A detailed configuration and operation of the management server 300 will be described below with reference to FIG. 4.

As described above, since the image forming system 1000 according to the present exemplary embodiment may perform the printing job by using the image forming apparatus that is nearest neighbor to the electronic apparatus, the user may easily perform the printing job even under a new network environment.

In addition, the image forming system 1000 according to the present exemplary embodiment may detect a position of the electronic apparatus and/or a position of the image forming apparatus and may provide various services by using the detected positions. For example, the image forming system 1000 may automatically manage a movement of a resource such as the image forming apparatus. In addition, the image forming system 1000 may classify and manage the printing history of the user for each position. Since the image forming system according to the present exemplary embodiment may retrieve a neighbor image forming apparatus only by an operation of comparing the access points which are detected by the respective image forming apparatuses with each other, there is no need to change signals transmitted from the wireless access points in order to measure a distance between the image forming apparatuses. That is, the neighbor image forming apparatus may be retrieved without revision of the access point.

Although FIG. 1 describes a an embodiment in which the management server is included in the image forming system 1000, the management server may be omitted upon being implemented. This example will be described below with reference to FIGS. 10 and 11.

Figure 2:
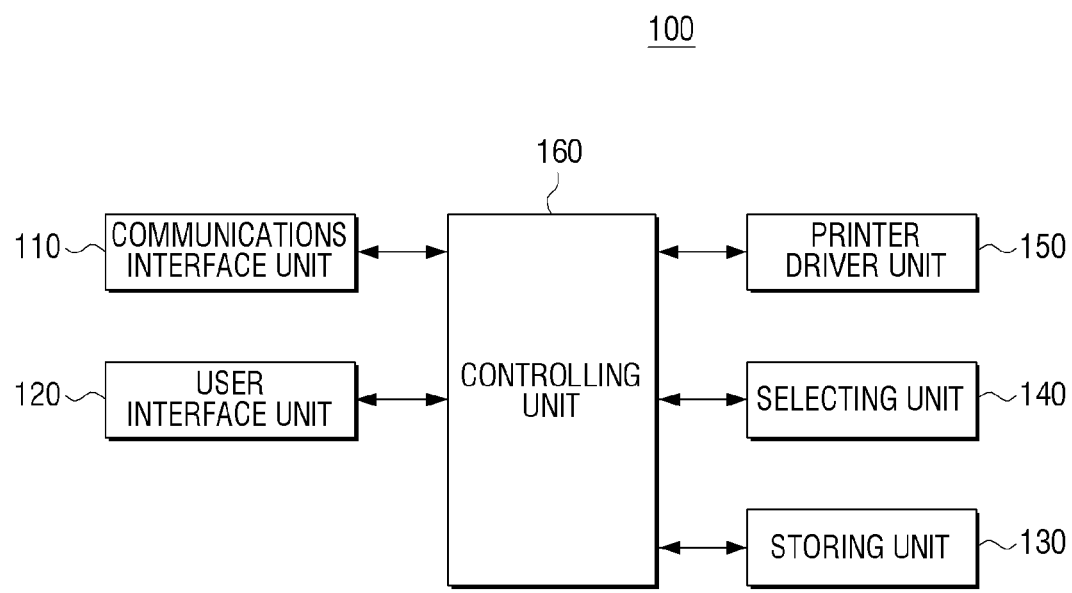
FIG. 2 is a block diagram showing a detailed configuration of an electronic apparatus of FIG. 1.

FIG. 2 is a block diagram showing a detailed configuration of an electronic apparatus of FIG. 1.

Referring to FIG. 2, the electronic apparatus 100 may be configured to include a communications interface unit (communications interface) 110, a user interface unit (user interface) 120, a storing unit (storage) 130, a selecting unit (selector) 140, a printer driver unit (printer driver) 150, and a controlling unit (controller) 160.

The communications interface unit 110 is connected to the image forming apparatus 200 and the management server 300. Specifically, the communications interface unit 110 is formed to connect the electronic apparatus 100 and an external apparatus with each other, which may be connected to the management server 300 via a local area network (LAN) and an Internet network and may also be connected to the management server 300 by a wireless communications scheme (e.g., a wireless communication scheme such as Global System for Mobile Communications (GSM), Universal Mobile Telephone System (UMTS), Long-Term Evolution (LTE), or the like).

In addition, the communications interface unit 110 retrieves accessible access points. Specifically, the communications interface unit 110 may retrieve the accessible access points (specifically, service set identifier (SSID) and basic set identifier (BSID)) around the electronic apparatus 100 (in the area of or the vicinity of the electronic apparatus 100) and received signal strength indication (received signal strength indicator) (RSSI) with each access point.

Further, the communications interface unit 110 may receive information of a neighbor access point of each of the plurality of image forming apparatuses. Specifically, in an embodiment in which the electronic apparatus 100 directly selects a neighbor image forming apparatus, the communications interface unit 110 may receive the information of the neighbor access point from each of the plurality of image forming apparatuses 200-1 and 200-3, or may receive the information of the neighbor access point of each of the plurality of image forming apparatuses from the management server 300 having the information of the neighbor access points of the plurality of image forming apparatuses.

The information of the neighbor access points, which corresponds to information on the access points retrieved by the communications interface unit 110, may include service set identifier (SSID), basic set identifier (BSID), and received signal strength indicator (RSSI).

In addition, in an embodiment in which the management server 300 determines the image forming apparatus neighboring to the electronic apparatus 100, the communications interface unit 110 may transmit information on the retrieved accessible access points to the management server 300. In addition, in response to the transmission of the information on the access points, the communications interface unit 110 may receive information on the neighbor image forming apparatus which is determined by the management server 300.

In addition, the communications interface unit 110 requests information on the reservoir in which the printing data is to be stored to the management server 300 and receives the information on the reservoir. The reservoir may be an apparatus in which corresponding printing data is stored, until a user inputs printing instructions into a certain image forming apparatus, and may receive, from the management server 300, information on a reservoir in which the printing data is to be temporarily stored until it is printed, in an embodiment in which the image forming system 1000 supports a pull printing. The pull printing is a printing scheme in which the printing job is not performed according to the transmission of the printing data but is performed when the user performs authentication on the certain image forming apparatus. In addition, the reservoir may be the image forming apparatus that is nearest neighbor to the management server 300 or the electronic apparatus 100.

In addition, the communications interface unit 110 may transmit the printing data. Specifically, the communications interface unit 110 may transmit printing data generated by a printer driver unit 150 which is to be described below to an image forming apparatus selected by a selecting unit 140 which is to be described below.

In addition, the communications interface unit 110 may receive a printer driver. Specifically, in an embodiment in which the printer driver corresponding to the image forming apparatus selected by the selecting unit 140 which is to be described below is not installed in the electronic apparatus 100, the communications interface unit 110 may receive the printer driver corresponding to the corresponding image forming apparatus from the management server 300.

The user interface unit 120 may have a plurality of function keys enabling the user to set or select a variety of functions supported by the electronic apparatus 100 and may display a variety of information provided by the electronic apparatus 100. The user interface unit 120 may be implemented as an apparatus capable of simultaneously implementing input and output such as a touch screen and may also be implemented as an apparatus implemented by a combination of a mouse and a monitor.

The user interface unit 120 receives the printing instructions for the document. In an embodiment, the user interface unit 120 may set a printing option which is to be applied to the document. In addition, the user interface unit 120 may select an image forming apparatus in which the corresponding document is to be printed. Specifically, the user interface unit 120 may display image forming apparatuses to which the electronic apparatus is accessible and may select one of the displayed image forming apparatuses as an image forming apparatus in which the printing job is to be performed. In an embodiment, the user interface unit 120 may display proximity between the corresponding image forming apparatus and the electronic apparatus 100 together with the information on the accessible image forming apparatus. An example of a user interface window which may be displayed on the user interface unit 120 will be described below in connection with FIG. 12.

The user interface unit 120 displays information on a printing progress matter of the image forming apparatus. In an embodiment in which an error occurs in the image forming apparatus by which the printing data is transmitted, the user interface unit 120 may display image forming apparatuses neighboring to the image forming apparatus in which the error occurs, and may select one of the displayed image forming apparatuses. An example of a user interface window which may be displayed on the user interface unit 120 will be described below in connection with FIGS. 17 and 18.

The storing unit 130 stores files. Specifically, the storing unit 130 may store files created by a document creating application, or the like. The stored files may be a document file having extension such as DOC, HWP, or the like, an image file having extension such as BMP, JPG, or the like, and a printing data file having extension such as PDF, XPS, or the like.

In addition, the storing unit 130 may store the printing data created by a printer driver unit 150 which is to be described below. The stored printing data may be deleted in an embodiment in which the corresponding printing data is printed by a certain image forming apparatus.

In addition, the storing unit 130 stores information of an access point to which the electronic apparatus 100 is accessible. Specifically, the storing unit 130 may stores information on the accessible access point which is retrieved by the communications interface unit 110. This information is used to detect whether the electronic apparatus 100 has moved to a new position in the future.

In addition, the storing unit 130 may store the information of the neighbor access point of the image forming apparatus 200. In addition, the storing unit 130 may store information on the image forming apparatus selected by a selecting unit 140 which is to be described below (e.g., address information necessary to perform the printing job with the image forming apparatus (e.g., internet protocol (IP) address, or the like)).

The storing unit 130 may be implemented by a storage medium in the electronic apparatus 100 and an external storage medium, for example, a removable disk including a universal serial bus (USB) memory, a web server via a network, and the like.

The selecting unit 140 determines whether or not the position of the electronic apparatus 100 has been changed. Specifically, the selecting unit 140 may determine whether the electronic apparatus 100 has been moved and whether a selection of the nearest neighbor image forming apparatus is required by comparing the access point which is pre-retrieved and stored with a current access point. Upon being implementing, if it is impossible to perform the printing job by a default image forming apparatus, the selecting unit 140 may perform an operation of selecting the nearest neighbor image forming apparatus.

In addition, the selecting unit 140 selects the image forming apparatus that is nearest neighbor to the electronic apparatus among the plurality of image forming apparatuses based on the retrieved access point. Specifically, the selecting unit 140 may select the image forming apparatus that is nearest neighbor to the electronic apparatus by using the autonomously received information or select the nearest neighbor image forming apparatus by using the management server 300. In an embodiment in which the management server 300 is used will be described below in connection with FIG. 5 and an embodiment in which the management server 300 is not used will be described below in connection with FIGS. 10 and 11.

In an embodiment in which the selecting unit 140 selects the nearest neighbor image forming apparatus without using the management server 300, it may calculate proximity by comparing the information of the neighbor access point of each image forming apparatus with the access point which is retrieved by the communications interface unit 110. Specifically, proximity may be calculated by taking account of whether or not commonly retrieved access points are present in the received information of the plurality of neighbor access points and the retrieved access points, and the number of the commonly retrieved access points, or the proximity may be calculated by comparing received signal strength indications (received signal strength indicators) in the commonly retrieved access points with the received information of the plurality of neighbor access points and the retrieved access points.

In addition, the selecting unit 140 may select an immediately neighboring image forming apparatus based on the calculated proximity or provide the calculated proximity to the user to allow the user to select the image forming apparatus. A detailed method of calculating the proximity will be described below in connection with FIG. 8.

The printer driver unit 150 generates the printing data for the document. Specifically, the printer driver unit 150 may generate the printing data for the document by using a printer driver based on the printing instructions which are received via the user interface unit 120. In an embodiment, the printer driver unit 150 may generate the printing data by taking account of the printing option which is set by the user. The printer driver may be a universal printer driver that is applicable to a plurality of models. Alternatively, the printer driver unit 150 may include a plurality of printer drivers.

If the printing job is impossible by a pre-selected image forming apparatus (or a default image forming apparatus), the printer driver unit 150 may request the selecting unit 140 to retrieve a new image forming apparatus.

In an embodiment in which the image forming system 1000 supports the pull printing, the printer driver unit 150 requests information on the reservoir in which the generated printing data is to be stored to the management server 300. In addition, if the information on the reservoir is received as the request by the printer driver unit 150, the communications interface unit 110 may be controlled so that the generated printing data is transmitted to an apparatus corresponding to the received reservoir.

The controlling unit 160 may control the respective components included in the electronic apparatus 100. Specifically, if the printing instructions are received via the user interface unit 120, the controlling unit 160 may control the printer driver unit 150 so that the printing data for the document to which the printing instructions are input is generated.

In addition, the controlling unit 160 may control the communications interface unit 110 and the selecting unit 140 so as to retrieve the image forming apparatus that is nearest neighbor to the electronic apparatus 100 and may control the communications interface unit 110 so as to transmit the generated printing data to the image forming apparatus 200 selected by the selecting unit 140. In an embodiment in which the printer driver corresponding to the retrieved image forming apparatus is not installed, the controlling unit 160 may request the printer driver corresponding to the retrieved image forming apparatus to the management server 300 and install the printer driver in the electronic apparatus 100.

In addition, the controlling unit 160 displays a status of a current job. Specifically, the controlling unit 160 may detect an operation status of the image forming apparatus by which the printing data is transmitted. In addition, upon detecting the error in the image forming apparatus by which the printing data is transmitted, the controlling unit 160 may control the user interface unit 120 so that a list of other image forming apparatuses that are neighbor to the selected image forming apparatus 200 is displayed. In an embodiment, the retrieval of other image forming apparatuses that are neighbor to the image forming apparatus 200 may be performed by the electronic apparatus 100 and may also be performed by the management server 300.

In addition, if the user selects one of other image forming apparatuses which are displayed, the controlling unit 160 may control the communications interface unit 110 so that controlling instructions allowing the printing data to be transmitted to a newly selected image forming apparatus are transmitted to the image forming apparatus in which the error occurs.

As described above, since the electronic apparatus 100 according to the present exemplary embodiment may perform the printing job by using the image forming apparatus that is nearest neighbor thereto, the user may easily perform the printing job even under a new network environment.

Although FIG. 2 describes an exemplary embodiment in which each of the selecting unit 140, the printer driver unit 150, and the controlling unit 160 is a separate component, the selecting unit 140, the printer driver unit 150, and the controlling unit 160 may be implemented as one component upon being implemented.

Figure 3:
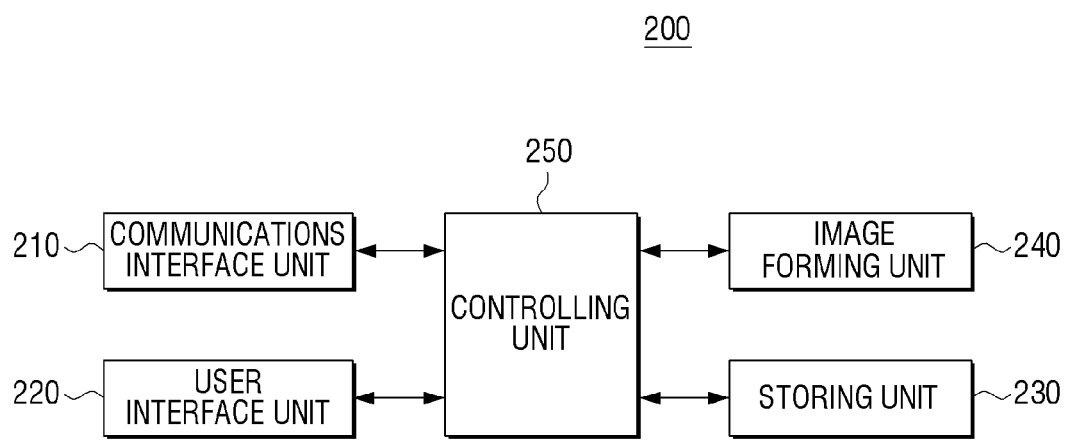
FIG. 3 is a block diagram showing a detailed configuration of an image forming apparatus of FIG. 1.

FIG. 3 is a block diagram showing a detailed configuration of the image forming apparatus of FIG. 1.

Referring to FIG. 3, the image forming apparatus 200 may be configured to include a communications interface unit (communications interface) 210, a user interface unit (user interface) 220, a storing unit (storage) 230, an image forming unit 240, and a controlling unit (controller) 250.

The communications interface unit 210 is formed to connect the image forming apparatus 200 to external apparatuses (e.g., the electronic apparatus 100, the management server 300, and other image forming apparatuses), and may be connected to the external apparatus via a local area network (LAN) and an Internet network and may also be connected to the external apparatus via a universal serial bus (USB) port. In addition, the communications interface unit 210 may receive the printing data.

In addition, the communications interface unit 210 retrieves accessible access points. Specifically, the communications interface unit 210 may retrieve the accessible access points (specifically, service set identifier (SSID) and basic set identifier (BSID)) around the image forming apparatus 200 and received signal strength indicator (RSSI) with each access point.

In addition, the communications interface unit 210 may transmit the retrieved accessible access points to the electronic apparatus 100 or the management server 300.

Further, the communications interface unit 210 may receive information of a neighbor access point from other image forming apparatuses. Specifically, the communications interface unit 210 may receive the information of the neighbor access points from other image forming apparatuses, or may receive the information of the neighbor access points of other image forming apparatuses from the management server 300 having the information of the neighbor access points of the plurality of image forming apparatuses.

The information of the neighbor access points, which corresponds to information on the access points retrieved by the communications interface unit 210, may include service set identifier (SSID), basic set identifier (BSID), and received signal strength indicator (RSSI).

In addition, in an embodiment in which the management server 300 determines other neighbor image forming apparatuses around the image forming apparatus 200, the communications interface unit 210 may transmit information on the retrieved accessible access points to the management server 300. In addition, in response to the transmission of the information on the access points, the communications interface unit 210 may receive information on other neighbor image forming apparatuses around the image forming apparatus 200 from the management server 300.

The communications interface unit 210 may receive the printing data. Specifically, the communications interface unit 210 may receive the printing data from the electronic apparatus 100 or other image forming apparatuses.

In addition, the communications interface unit 210 may advise the management server 300 of state information of the image forming apparatus 200. The state information may include information on whether the image forming apparatus may perform the printing (including whether or not the error occurs), information on functions which may be performed, information of the printer driver corresponding to the image forming apparatus, and the like.

In addition, the communications interface unit 210 may receive controlling instructions from the electronic apparatus 100 or the management server 300. The controlling instructions may be instructions for deleting the stored printing data, instructions for transmitting the stored printing data to a specific apparatus, and the like.

In addition, the communications interface unit 210 may request user authentication to the management server 300. Specifically, in an embodiment in which the image forming system 1000 is operated in a pull printing scheme, the communications interface unit 210 may request the user authentication by transmitting user information received via a user interface unit 220 which is to be described below to the management server 300.

In addition, the communications interface unit 210 may request the printing data to be printed to the management server 300. Specifically, in an embodiment in which the printing data corresponding to the authenticated user is stored in the management server 300, the communications interface unit 210 may request the management server 300 to transmit the printing data.

In addition, if the printing job is completed, the communications interface unit 210 may advise the management server 300 that the printing has been completed.

The user interface unit 220 may have a plurality of function keys enabling the user to set or select a variety of functions supported by the image forming apparatus 200 and may display a variety of information provided by the image forming apparatus 200. The user interface unit 220 may be implemented as an apparatus capable of simultaneously implementing input and output such as a touch screen and may also be implemented as an apparatus implemented by a combination of a mouse and a monitor.

The user interface unit 220 receives the authentication information. The authentication information, which may be information capable of identifying the user, may be a name of the user, identification (ID), employee identification number, personal identification number, or the like.

The user interface unit 220 receives a printing progress for the printing job requested by the user. Specifically, the user interface unit 220 may display a list of jobs that may be printed by the authenticated user (i.e., the jobs that the electronic apparatus generates and transmits the printing data to the reservoir), and may select at least one job from the displayed list.

In addition, the user interface unit 220 may set a printing option for the corresponding job. Specifically, the user interface unit 220 may display a preset printing option to the selected job and select an additional printing option or delete/change a pre-selected printing option.

In an embodiment in which the error occurs, the user interface unit 220 may display that the error has occurred. In an embodiment, the user interface unit 220 may know that the job may be performed in other image forming apparatuses and provide information on other surrounding neighbor image forming apparatuses retrieved by a controlling unit 250 to be described below.

The storing unit 230 may store the printing data. The stored printing data corresponds to an embodiment in which the corresponding image forming apparatus 200 is determined as the reservoir. In addition, the stored printing data may be deleted in an embodiment in which it is printed by the corresponding image forming apparatus or is printed by other image forming apparatuses.

In addition, the storing unit 230 stores information of an access point to which the image forming apparatus 200 is accessible. Specifically, the storing unit 230 may store information on the accessible access point which is retrieved by the communications interface unit 210. This information may be used to detect whether the image forming apparatus 200 has moved to a new position in the future. In addition, the storing unit 230 may store the information on the neighbor access points of other image forming apparatuses 200 and address information of other image forming apparatuses.

The storing unit 230 may be implemented by a storage medium in the image forming apparatus 200 and an external storage medium, for example, a removable disk including a universal serial bus (USB) memory, a web server via a network, and the like.

The image forming unit 240 prints the printing data. Specifically, the image forming unit 240 may perform the printing job on a printing paper by performing jobs such as parsing, rendering, and the like for the printing data.

The controlling unit 250 controls the respective components in the image forming apparatus 200. Specifically, if the printing data is received from another apparatus, the controlling unit 250 stores the received printing data in the storing unit 230. In addition, if the printing instructions for the authenticated user are input through the user interface unit 220, the controlling unit 250 performs the printing job for the printing data stored in the storing unit 230. If the printing data is not stored in the storing unit 230, the controlling unit 250 may request the management server 300 to transmit the printing data for the printing job requested by the user.

In addition, the controlling unit 250 may retrieve accessible access points according to the request of the management server 300 or the electronic apparatus 100 and transmit information on the retrieved access point to the management server 300 or the electronic apparatus 100.

In addition, the controlling unit 250 determines whether or not the position of the image forming apparatus 200 has been changed. Specifically, the controlling unit 250 may determine whether the image forming apparatus 200 has been moved by comparing the access point which is pre-retrieved and stored with a current access point.

In addition, the controlling unit 250 retrieves other image forming apparatuses that are neighbor to the image forming apparatus 200. Specifically, the controlling unit 250 may detect a relative distance to other image forming apparatuses by comparing information on the retrieved access points with information on the access points of other image forming apparatuses. The relative distance to other image forming apparatuses which is detected as described above may be provided to the electronic apparatus 100 by which the printing data is transmitted, in an embodiment in which the error occurs in the image forming apparatus.

Therefore, since the image forming apparatus 200 according to the present exemplary embodiment provides the information of an own access point to another apparatus, it may allow the image forming apparatus that is nearest neighbor to the electronic apparatus to be selected. In addition, the image forming apparatus 200 may detect whether or not it is moved by sensing the access point.

Figure 4:
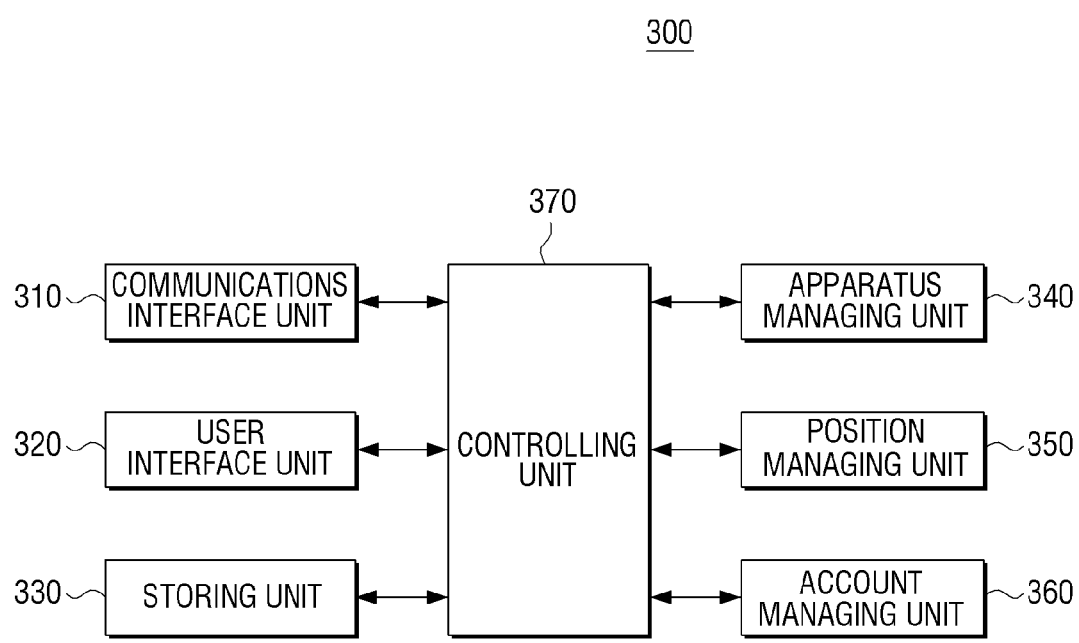
FIG. 4 is a block diagram showing a detailed configuration of a management server of FIG. 1.

FIG. 4 is a block diagram showing a detailed configuration of a management server of FIG. 1.

Referring to FIG. 4, the management server 300 may be configured to include a communications interface unit (communications interface) 310, a user interface unit (user interface) 320, a storing unit (storage) 330, an apparatus managing unit (apparatus manager) 340, a position managing unit (position manager) 350, an account managing unit (account manager)(360, and a controlling unit (controller) 370.

The communications interface unit 310 is formed to connect the electronic apparatus 100 and a plurality of image forming apparatuses 200 with each other, which may be connected to each other via a local area network (LAN) and an Internet network and may also be connected each other by a wireless communications scheme (e.g., a wireless communication scheme such as Global System for Mobile Communications (GSM), Universal Mobile Telephone System (UMTS), Long-Term Evolution (LTE), or the like).

The communications interface unit 310 may receive information of a neighbor access point of each of the plurality of image forming apparatuses. Specifically, the communications interface unit 310 may receive the information of the neighbor access point from each of the plurality of image forming apparatuses 200-1 and 200-3.

The information of the neighbor access point may be service set identifier (SSID), basic set identifier (BSID), and received signal strength indicator (RSSI).

Further, the communications interface unit 310 may receive information of access points retrieved by the electronic apparatus 100 from the electronic apparatus 100. In an embodiment, the communications interface unit 310 may transmit information on a nearest neighbor image forming apparatus selected by the position managing unit 350 to be described below to the electronic apparatus 100 by which the information of the access point is transmitted.

Further, the communications interface unit 310 may receive a request for the information of the neighbor access points of the plurality of image forming apparatuses from the electronic apparatus 100. In an embodiment, the communications interface unit 310 may transmit the information of the neighbor access points of the plurality of image forming apparatuses which is previously received and pre-stored to the electronic apparatus 100.

In addition, the communications interface unit 310 may transmit information on another image forming apparatus 200-2 that is nearest neighbor to a first image forming apparatus 200-1 selected by the position managing unit 350 to be described below to the first image forming apparatus 200-1.

Further, the communications interface unit 310 may receive a request for the information of the neighbor access points of other image forming apparatuses 200-2, . . . from the first image forming apparatus 200-1. In an embodiment, the communications interface unit 310 may transmit the information of the neighbor access points of the plurality of other image forming apparatuses 200-2, . . . which is previously received and pre-stored to the image forming apparatus 200-1. In response to the transmission of the information described above, the communications interface unit 310 may additionally receive information on other neighbor image forming apparatuses around the first image forming apparatus 200-1 from the first image forming apparatus 200-1.

In addition, the communications interface unit 310 receives a request of the transmission of information on a reservoir from the electronic apparatus 100. Further, the communications interface unit 310 may advise the electronic apparatus 100 by which the reservoir information is requested of a reservoir determined by the position managing unit 350 to be described below.

In addition, the communications interface unit 310 receives state information of each of the electronic apparatus 100 and the plurality of image forming apparatuses 200 that are connected over the network. In addition, the communications interface unit 310 may transmit controlling instructions to at least one of the electronic apparatus 100 and the plurality of image forming apparatuses 200. The controlling instructions may be instructions for deleting the stored printing data or instructions for transmitting the stored printing data to other apparatuses.

In addition, the communications interface unit 310 transmits a printer driver. Specifically, in an embodiment in which a printer driver for an image forming apparatus that is nearest neighbor to the electronic apparatus 100 is not installed in the electronic apparatus 100, the communications interface unit 310 may transmit a printer driver corresponding to the corresponding image forming apparatus to the electronic apparatus 100 in response to the request of the electronic apparatus 100.

In addition, the communications interface unit 310 transmits and receives printing data. Specifically, in an embodiment in which the management server 300 is used as a reservoir of a pull printing, the communications interface unit 310 may receive the printing data from the electronic apparatus 100. In addition, the communications interface unit 310 may transmit pre-stored printing data to the image forming apparatus 200.

In addition, the communications interface unit 310 may transmit controlling instructions to the electronic apparatus 100 or the image forming apparatus 200. The controlling instructions may be instructions for deleting the pre-stored printing data, instructions for transmitting the stored printing data to a specific apparatus, and the like.

In addition, the communications interface unit 310 may receive a request of user authentication from the image forming apparatus 200. Specifically, in an embodiment in which the image forming system 1000 is operated in a pull printing scheme, the communications interface unit 310 may receive user information input from the image forming apparatus 200 and may transmit an authentication result in an account managing unit 360 to be described below to the image forming apparatus 200 requesting the authentication.

In addition, the communications interface unit 310 may receive a request of transmission of the printing data to be printed from the image forming apparatus 200. Specifically, in an embodiment in which the image forming system 1000 is operated in the pull printing scheme and the printing data is not stored in the image forming apparatus authenticated by the user, the communications interface unit 310 may receive the request of transmission of the printing data from the corresponding image forming apparatus. In response to the request, in an embodiment in which the communications interface unit 310 stores the printing data therein, the communications interface unit 310 may transmit the stored printing data to the corresponding image forming apparatus. On the other hand, in an embodiment in which the printing data is not stored in the management server 300, the communications interface unit 310 may transmit the controlling instructions allowing an apparatus having the corresponding printing data stored therein to perform transmission of the corresponding printing data to an apparatus requesting the printing data.

The user interface unit 320 may have a plurality of function keys enabling the user to set or select a variety of functions supported by the management server 300 and may display a variety of information provided by the management server 300. The user interface unit 320 may be implemented as an apparatus capable of simultaneously implementing input and output such as a touch screen and may also be implemented by combining an input apparatus such as a mouse, a keyboard, or the like and a display device such as a cathode-ray tube monitor, a liquid crystal display monitor, a light emitting diode, or the like.

The storing unit 330 may store information of the neighbor access point of the image forming apparatus 200. In addition, the storing unit 330 may store the information of the access point received from the electronic apparatus 100.

In addition, the storing unit 330 stores information on a user account. The information on the user account is information including information for authenticating the user (e.g., identification (ID) and personal identification number), or the like.

In addition, the storing unit 330 stores a job history for the corresponding user account. The job history may include position information of the electronic apparatus 100 performing the job. For example, in an embodiment in which the electronic apparatus 100 performs the printing job by retrieving the first image forming apparatus 200-1 as the nearest neighbor image forming apparatus and the first image forming apparatus 200-1 is positioned on the thirty-fourth floor, for example, the storing unit 330 may store a printing history that a first user has performed the printing job on the thirty-fourth floor.

In addition, the storing unit 330 stores information on an image forming apparatus account. information on the image forming apparatus account is information including a physical address of the image forming apparatus 200, an account address, and a user account capable of using the corresponding image forming apparatus.

In addition, in an embodiment which the management server 300 is used as the reservoir, the storing unit 330 may store the printing data.

The storing unit 330 may be implemented by a storage medium in the management server 300 and an external storage medium, for example, a removable disk including a universal serial bus (USB) memory, a file server via a network, and the like.

The apparatus management unit 340 manages information on a place in which the image forming apparatus 200 is positioned. In addition, the apparatus managing unit 340 determines whether the position of the image forming apparatus 200 has been changed. Specifically, the apparatus managing unit 340 may determine whether the image forming apparatus 200 has been moved by comparing the pre-stored access points with a current access point.

In addition, if the position of the image forming apparatus 200 has been changed, the apparatus managing unit 340 detects a relative distance to other image forming apparatuses by comparing information of the access points which is newly received (specifically, newly retrieved and received at the changed position) with information of access points of other image forming apparatuses, thereby making it possible to detect the changed position.

The position managing unit 350 selects the image forming apparatus that is nearest neighbor to the electronic apparatus among the plurality of image forming apparatuses based on the access points retrieved by the electronic apparatus 100. Specifically, the position managing unit 350 may select the image forming apparatus that is nearest neighbor to the electronic apparatus by comparing the retrieved access points of the electronic apparatus and each of the plurality of image forming apparatuses. Alternately, the position managing unit 350 may select the image forming apparatus that is nearest neighbor to the electronic apparatus by comparing the retrieved access points of the electronic apparatus and each of the plurality of image forming apparatuses, and received signal strength indicators of the access points with one another. A detailed selection method will be described below with reference to FIGS. 6 to 8.

The position managing unit 350 determines a reservoir in which the generated printing date is to be stored among the plurality of image forming apparatuses. Specifically, the position managing unit 350 may determine the image forming apparatus having the nearest distance to the electronic apparatus 100 as the reservoir in which the printing data is to be stored.

In addition, if the error occurs in the determined reservoir, the position managing unit 350 may determine a new reservoir instead of the reservoir in which the error occurs. Specifically, the position managing unit 350 may determine another image forming apparatus to which the image forming apparatus having the error occurred therein is nearest neighbor as the new reservoir.

In addition, if the position managing unit 350 is informed from the image forming apparatus 200 that the printing of the printing data is completed, it deletes the corresponding printing data from the reservoir in which the printing data is stored. Although the present exemplary embodiment describes an embodiment in which the printing data is deleted on condition of the printing completion of the printing data, the printing data may be deleted if a data storage period exceeds a preset time.

The account managing unit 360 performs a management for the user account. Specifically, if the authentication request is received from the image forming apparatus 200 based on preset information on the user account stored in the storing unit 330, the account managing unit 360 may perform authentication based on information included in the received authentication request and may advise the corresponding image forming apparatus of the result.

The controlling unit 370 may control the respective components included in the management server 300. Specifically, the controlling unit 370 controls the communications interface unit 310 so that information of neighbor access point of the image forming apparatus 200 is periodically collected. In addition, the controlling unit 370 controls the apparatus managing unit 340 to detect whether there is a moved image forming apparatus by using the collected information of the neighbor access point.

In addition, if the controlling unit 370 receives the information of the access point retrieved by the electronic apparatus 100, the controlling unit 370 may control the position managing unit 350 so as to retrieve the image forming apparatus that is nearest neighbor to the electronic apparatus 100 and may control the communications interface unit 310 so as to transmit information on the retrieved nearest neighbor image forming apparatus to the electronic apparatus 100.

Further, if the controlling unit 370 receives a request of the information of the neighbor access point from the electronic apparatus 100 or the image forming apparatus 200, the controlling unit 370 may control the communications interface unit 310 so as to transmit the requested information.

In addition, if the controlling unit 370 receives a request of reservoir information from the electronic apparatus 100, the controlling unit 370 may control the position managing unit 350 so as to determine a reservoir and may control the communications interface unit 310 so as to transmit the information on the determined reservoir to the corresponding electronic apparatus 100.

In addition, the controlling unit 370 may detect operation states of the electronic apparatus 100 and the image forming apparatus 200 connected to each other, and when the error occurs in the apparatus which is operated as the reservoir, the controlling unit 370 may control the position managing unit 350 so as to determine a new reservoir and may store the printing data in the determined new reservoir.

As described above, since the management server 300 according to the present exemplary embodiment may provide information determining or capable of determining the image forming apparatus that is nearest neighbor to the electronic apparatus to the electronic apparatus, the user may easily perform the printing job even under a new network environment.

In addition, the management server 300 according to the present exemplary embodiment may detect a position of the electronic apparatus and/or a position of the image forming apparatus and may perform various managements (e.g., a management of the position of the image forming apparatus and provision of information on the job history according to the position) by using the detected positions.

Although FIG. 4 shows and describes an exemplary embodiment in which the management server 300 performs a function as an authentication server and also performs a function as a storage server, the authentication function and the storage function may be performed in another server upon being implemented.

Figure 5:
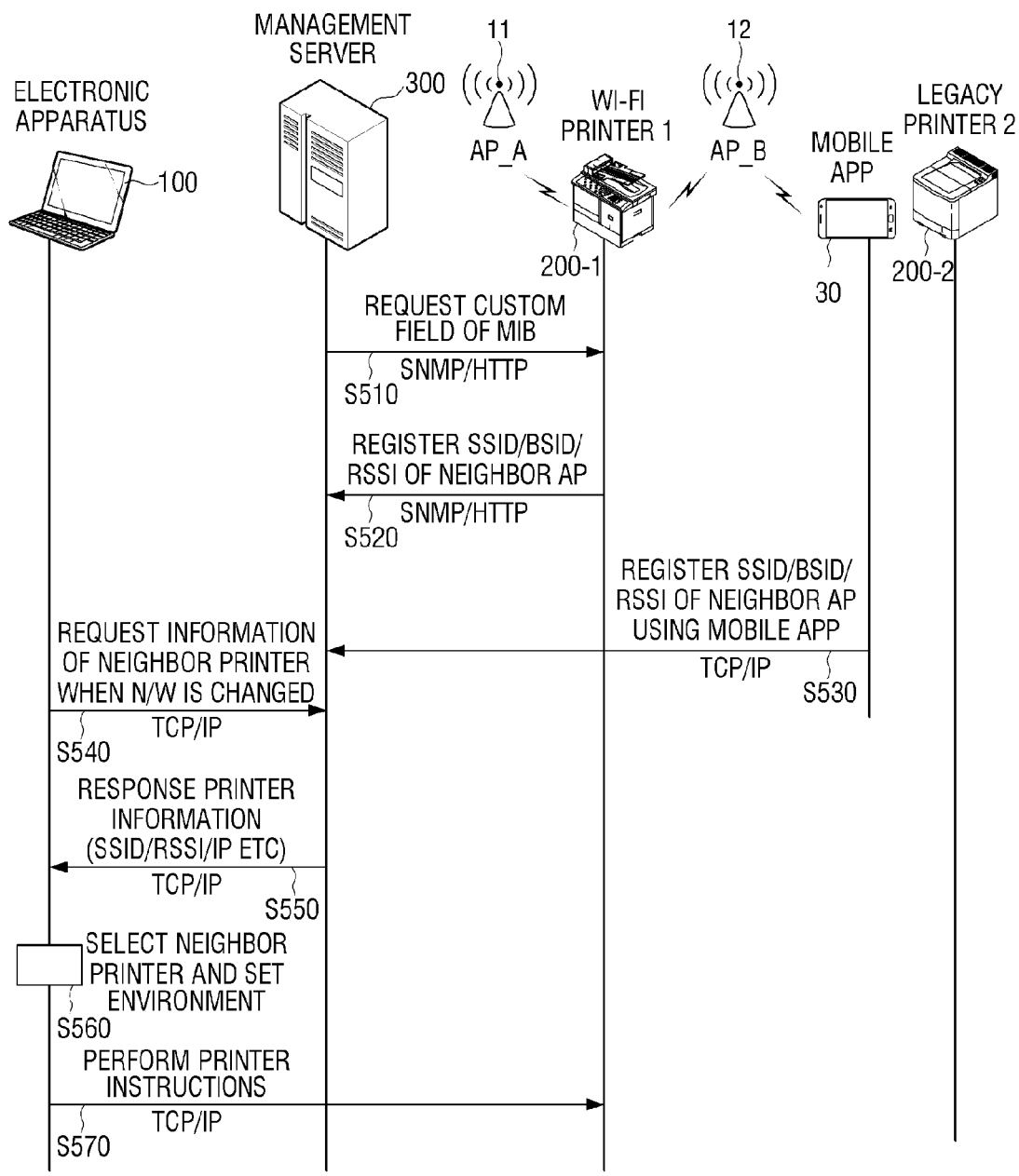
FIG. 5 is a sequence diagram for describing an operation of an image forming system according to an exemplary embodiment.

FIG. 5 is a sequence diagram for describing an operation of an image forming system according to an exemplary embodiment. Specifically, the operation of the image forming system according to the first exemplary embodiment corresponds to an embodiment in which the management server 300 receives the information of the neighbor access points of the image forming apparatus and the electronic apparatus 100 selects the nearest neighbor image forming apparatus.

Referring to FIG. 5, first, the management server 300 may request the information of the neighbor access points to surrounding image forming apparatuses (S510). For example, the management server 300 may make the request using a custom field of MIB. In response to the request, the image forming apparatus 200-1 may retrieve the accessible access points and may transmit the information on the retrieved access points to the management server 300 (S520). The information on the retrieved access points may be transmitted to the management server 300 using for example simple network management protocol or hypertext transfer protocol (SNMP/HTTP). The management server 300 may register at least one of a service set identifier (SSID), basic set identifier (BSID), and received signal strength indicator (RSSI) in the management server 300, which may be the transmitted information or part of the transmitted information.

In an exemplary embodiment in which the image forming apparatus 200-2 may not obtain the information of the accessible access points because it does not have a wireless communications function, a mobile device 30 having the wireless communications function may retrieve the accessible access points next to the image forming apparatus 200-2 which does not have the wireless communications function and may transmit the information on the retrieved access points to the management server 300 (S530). The mobile device 30 may transmit the information on the retrieved access points to the management server 300 by using for example Transmission Control Protocol/Internet Protocol (TCP/IP).

Next, in an embodiment in which the electronic apparatus 100 enters a new network or may not perform the printing job with a default image forming apparatus, the electronic apparatus 100 may request the transmission of the information of the neighbor access points of the image forming apparatus 200 to the management server 300 (S540).

In response to the request, the management server 300 provides the pre-stored information of the neighbor access points of the plurality of image forming apparatuses 200 (S550). In an embodiment, the management server 300 may not provide the entire information of the neighbor access points of the plurality of image forming apparatuses 200, but provide the information of the neighbor access points according to a predetermined condition. For example, the management server 300 may receive the information of the access point having best received signal strength indicator from the electronic apparatus 100 and may provide only the information of the neighbor access point of the image forming apparatus which is accessible to the corresponding access point.

The electronic apparatus 100 receiving the information of the neighbor access points of the plurality of image forming apparatuses may retrieve the accessible access points and compare the retrieved access points with the received access points of the image forming apparatuses, thereby select the image forming apparatus that is nearest neighbor to the electronic apparatus 100 (S560). A detailed selection operation will be described below with reference to FIGS. 6 to 8.

In addition, the electronic apparatus 100 may perform the printing job by transmitting the printing data to the selected image forming apparatus (S570).

FIG. 6 is a diagram showing an example of the information of the neighbor access points stored by the management server of FIG. 4.

Referring to FIG. 6, the management server 300 stores wireless access information of each of the plurality of image forming apparatuses to which the electronic apparatus may be connected. The wireless access information may be service set identifier (SSID), basic set identifier (BSID), and received signal strength indicator (RSSI) as shown. Although the example shown in FIG. 6 illustrates an exemplary embodiment in which all of SSID, BSID, and RSSI are used, only a portion of three may be used upon being implemented.

FIG. 7 is a diagram for describing a first example selecting a neighbor image forming apparatus by using the stored information of the neighbor access points.

Referring to FIG. 7, the access point having the highest received signal strength indicator in the electronic apparatus 100 is AP_A 11, the access point having the highest received signal strength indicator in the first image forming apparatus 200-1 is AP_A 11, and the access point having the highest received signal strength indicator in the second image forming apparatus 200-2 is AP_B 12.

Referring to this, it may be appreciated that the electronic apparatus 100 and the first image forming apparatus 200-1 are nearer to the AP_A 11 than AP_B 12 and the second image forming apparatus is nearer to the AP_B 12 than the AP_A 11.

Therefore, the electronic apparatus 100 may select the first image forming apparatus 200-1 as an apparatus that is nearest thereto.

Although one or more exemplary embodiments described above describes one or more embodiments in which the neighbor image forming apparatus is selected by using which access point has the best received signal strength indicator, the neighbor image forming apparatus may be selected by digitizing the received signal strength indicator upon being implemented. An example thereof will be described with reference to FIG. 8.

FIG. 8 is a diagram for describing a second example selecting a neighbor image forming apparatus by using the stored information of the neighbor access points.

Referring to FIG. 8, proximity between the electronic apparatus 100 and the first image forming apparatus 200-1 and proximity between the electronic apparatus 100 and the second image forming apparatus 200-2 are disclosed. Each proximity is an average or a standard variance of differences in received signal strength indicators for the access points that are commonly retrieved in the electronic apparatus 100 and the image forming apparatus 200. Referring to FIG. 8 shown, proximity between the electronic apparatus 100 and the first image forming apparatus has the average of −3.08 and the standard variance of 2.91 and proximity between the electronic apparatus 100 and the second image forming apparatus has the average of −3.44 and the standard variance of 5.55. That is, as the average and the standard variance are small, the difference becomes small. In an embodiment, the first image forming apparatus 200-1 may be selected as the nearest apparatus.

An exemplary embodiments described above describes an embodiment in which the image forming apparatus is selected by using the received signal strength indicator of the access point, the nearest apparatus may be determined by using the number of access points that are commonly retrieved without using the received signal strength indicator and by using various schemes upon being implemented.

Figure 9:
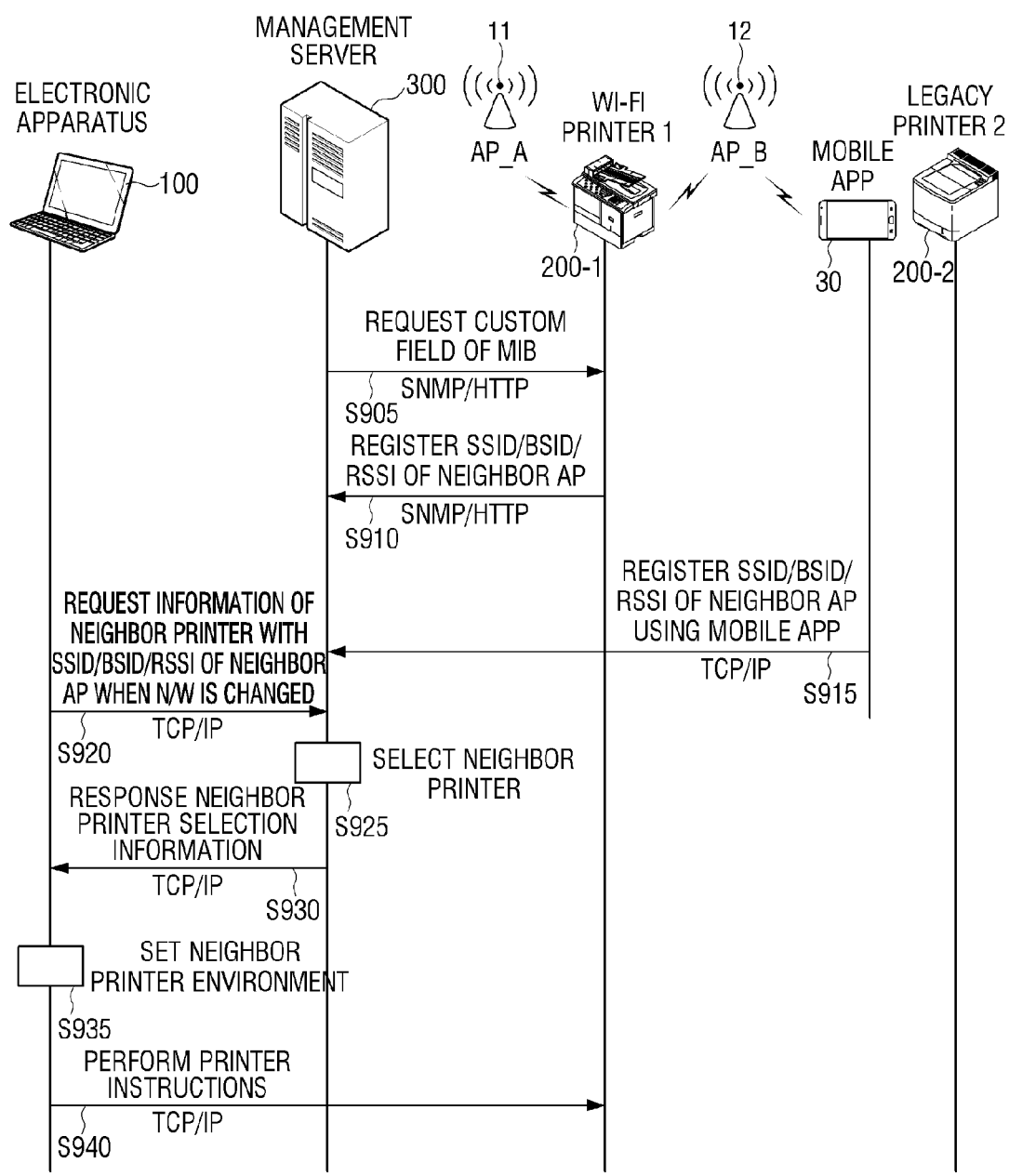
FIG. 9 is a sequence diagram for describing an operation of an image forming apparatus according to an exemplary embodiment.

FIG. 9 is a sequence diagram for describing an operation of an image forming system according to an exemplary embodiment. Specifically, the operation of the image forming system according to the second exemplary embodiment corresponds to an embodiment in which the management server 300 selects the image forming apparatus that is nearest neighbor to the electronic apparatus 100.

Referring to FIG. 9, first, the management server 300 may request the information of the neighbor access point to surrounding image forming apparatuses (S905). In response to the request, the image forming apparatus 200-1 may retrieve the accessible access points and may transmit the information on the retrieved access points to the management server 300 (S910)

In one or more exemplary embodiments in which the image forming apparatus 200-2 may not obtain the information of the accessible access points because it does not have a wireless communications function, the mobile device 30 having the wireless communications function may retrieve the accessible access points next to the image forming apparatus 200-2 which does not have the wireless communications function and may transmit the information on the retrieved access points to the management server 300 (S915).

Next, in an embodiment in which the electronic apparatus 100 enters a new network or may not perform the printing job with a default image forming apparatus, the electronic apparatus 100 may retrieve the accessible access points and transmit the information of the retrieved access points to the management server 300 (S920).

In response to the operation of the electronic apparatus 100 as described above, the management server 300 may select the image forming apparatus that is nearest neighbor to the electronic apparatus 100 by comparing the information of the access points received from the electronic apparatus 100 and each of the plurality of image forming apparatuses 200 (S925). A detailed selection operation is the same as those of FIGS. 7 and 8.

In addition, the management server 300 may advise the electronic apparatus 100 of the information on the selected image forming apparatus (S930).

The electronic apparatus 100 receiving the information on the neighbor image forming apparatus may set the corresponding image forming apparatus as the image forming apparatus by which the printing data is to be printed (S935) and perform the printing job by transmitting the printing data to the corresponding image forming apparatus (S940).

Figure 10:
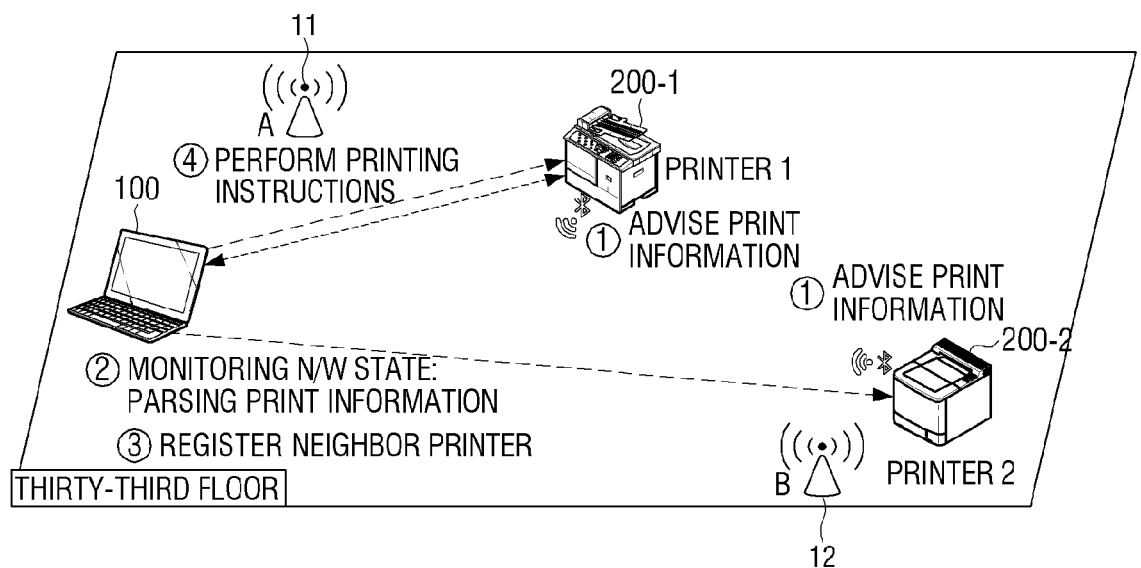
FIG. 10 is a block diagram showing an image forming system according to an exemplary embodiment.
Figure 11:
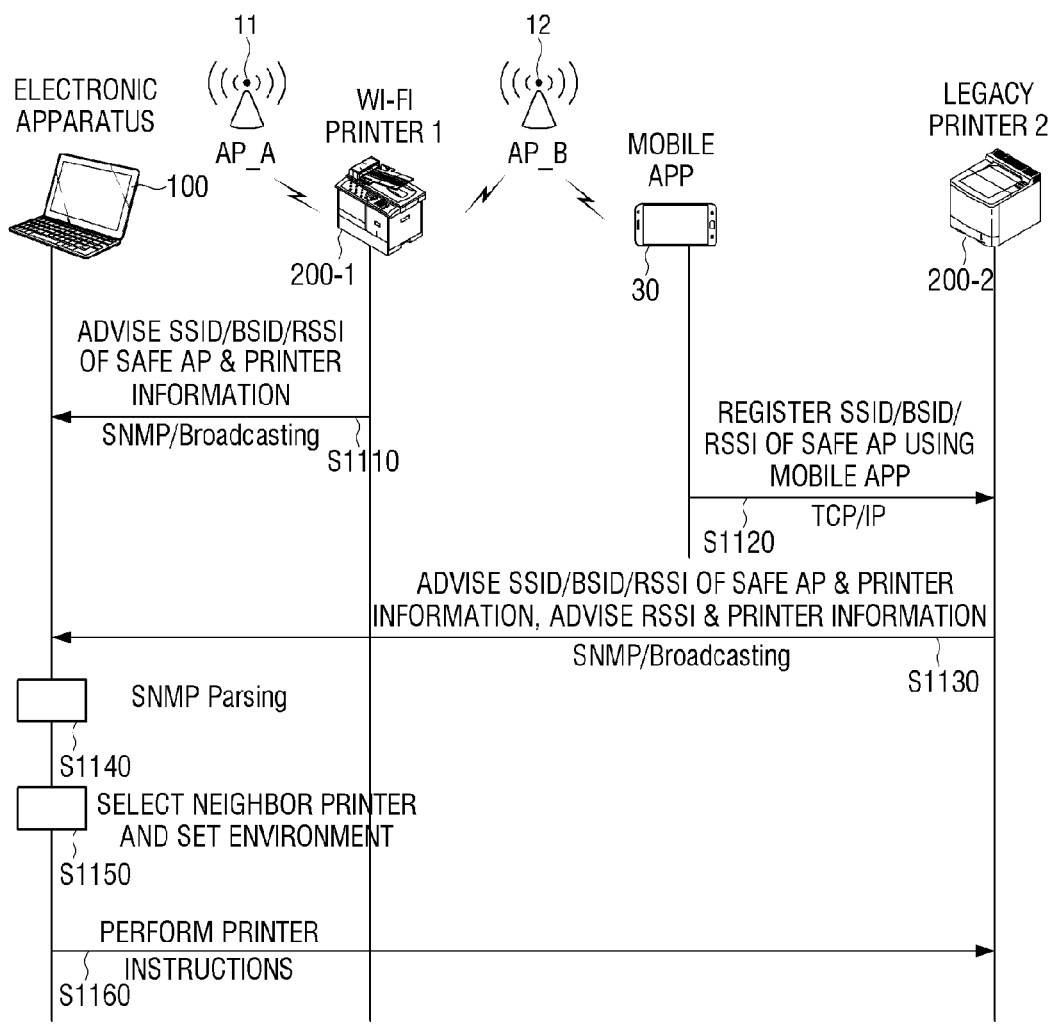
FIG. 11 is a sequence diagram for describing an operation of the image forming apparatus according to an exemplary embodiment in FIG. 10.

FIG. 10 is a block diagram showing an image forming system according to an exemplary embodiment and FIG. 11 is a sequence diagram for describing an operation of the image forming apparatus according to an exemplary embodiment shown in FIG. 10. Specifically, the operation of the image forming system according to an exemplary embodiment shown in FIG. 10 corresponds to an embodiment in which the electronic apparatus 100 selects the nearest neighbor image forming apparatus without using the management server 300.

Referring to FIGS. 10 and 11, in an exemplary embodiment in which the electronic apparatus 100 enters a new network or may not perform the printing job with a default image forming apparatus, the electronic apparatus 100 may request the transmission of the information of the neighbor access points to each of the image forming apparatuses 200 connected to the network (S1110, ①)).

In one or more exemplary embodiments in which the image forming apparatus 200-2 may not obtain the information of the accessible access points because it does not have a wireless communications function, a mobile device 30 having the wireless communications function may retrieve the accessible access points next to the image forming apparatus 200-2 which does not have the wireless communications function (S1120) and may transmit the information on the retrieved access points to the electronic apparatus 100 (S1130, ①)).

The electronic apparatus 100, which monitors the network (N/W) state and which receives the information of the neighbor access points, may parse the received information (S1140, ②)) and may select the image forming apparatus 200-2 that is nearest neighbor to the electronic apparatus 100 by comparing the access points retrieved by the electronic apparatus 100 with the received information of the access points of the image forming apparatus (S1150, ③)). Upon being implemented, the electronic apparatus 100 may automatically select the nearest neighbor image forming apparatus and may receive the selection of the image forming apparatus by which the printing job is to be performed from the user by displaying the proximity with each of the image forming apparatuses to the user. An example of a user interface window which may be displayed is the same as that of FIG. 12.

In addition, the electronic apparatus 100 may perform the printing job by transmitting the printing data to the selected image forming apparatus 200-2 (S1160, ④)).

FIG. 12 is a diagram showing an example of a user interface window which may be displayed on the electronic apparatus of FIG. 11.

Referring to FIG. 12, the user interface window 1200 displays image forming apparatuses to which the electronic apparatus 100 is accessible, and proximity 1210, a model name 1220, position information 1230, an IP address 1240, and medium access control (MAC) address information 1250 on each image forming apparatus. Upon being implemented, the user interface window 1200 may further display information such as whether or not the corresponding image forming apparatus performs the printing job, whether or not the error occurs, information of available functions (e.g., whether or not a color printing is performed), and the like.

The proximity 1210 is a region in which the proximity as described in FIG. 8 is schematized and displayed.

Since the user interface window 1200 as described above displays the proximity with the electronic apparatus, the user may easily recognize the image forming apparatus that is neighbor to the electronic apparatus 100.

Figure 13:
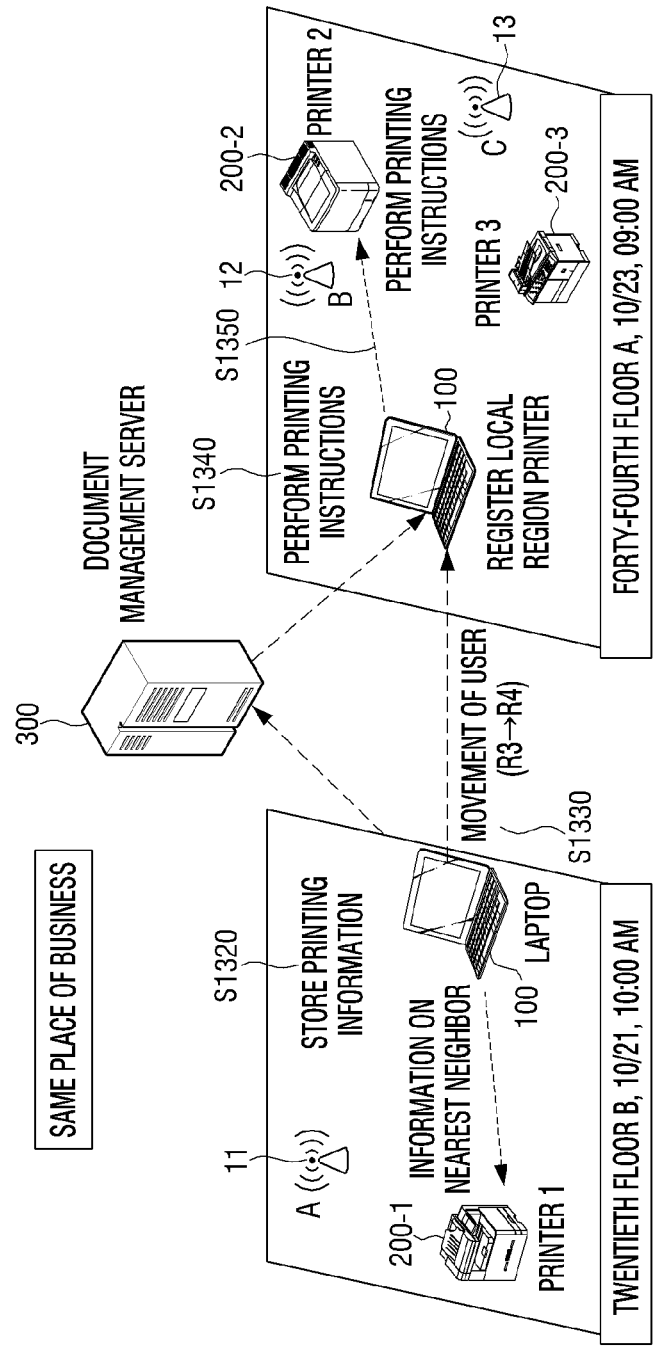

FIGS. 13 and 14 are block diagrams showing an operation example of the management server of FIG. 1.

Referring to FIG. 13, the management server 300 stores information on the printing history of the electronic apparatus (S1320). In an embodiment, by using position information of the image forming apparatus that is neighbor to the electronic apparatus 100, the management server 300 detects the position of the electronic apparatus and simultaneously stores the position information in the printing history for the corresponding job.

Next, if the user of the electronic apparatus 100 moves (S1330) to perform the printing job in a new place, the management server 300 automatically provides information on an image forming apparatus that is nearest neighbor to the new place to the electronic apparatus 100 (registers local region printer) (S1340). In response to the provision of the information by the management server 300, the electronic apparatus 100 describes the provided nearest neighbor image forming apparatus as a default image forming apparatus in order to perform the printing job in the new place (S1350). In one or more exemplary embodiments in which the printer driver corresponding to the corresponding image forming apparatus is not installed in the electronic apparatus 100, the electronic apparatus 100 may request the corresponding printer driver to the management server 300 to install it therein.

As a result, even in an embodiment in which the user moves to the new place and performs the output for a document, the neighbor image forming apparatus is automatically retrieved and is set as the default image forming apparatus, such that the user may easily perform the printing job without performing a separate setting operation.

In addition, information on those as described above is also provided to the management server 300 as the printing history.

As such, in managing the printing history by the management server 300, since the position information is simultaneously stored, the printing job may be retrieved by the place in which the user was located, as shown in FIG. 14.

Figure 15:
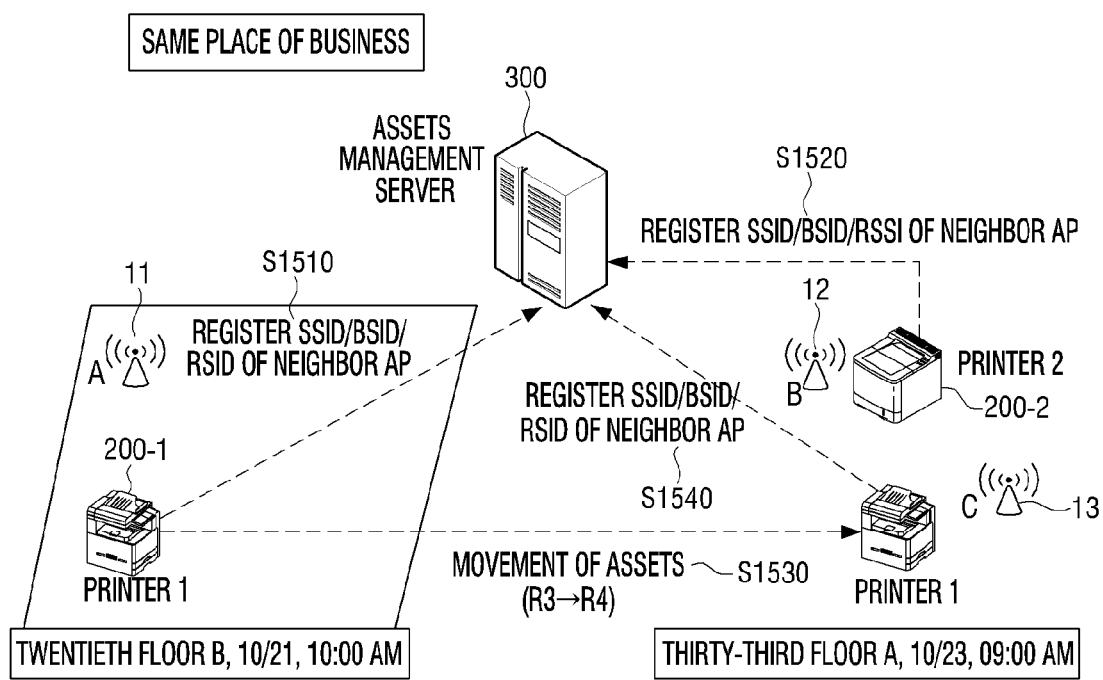
FIG. 15 is a block diagram showing a second operation example of a management server of FIG. 1.

FIG. 15 is a block diagram showing a second operation example of the management server of FIG. 1.

Referring to FIG. 15, the management server 300 stores information of the access points of each image forming apparatus (S1510). In addition, the management server 300 periodically collects the information of the access points of each image forming apparatus. Therefore, once the image forming apparatus 200-1 moves to the new place by a manager (S1530), the access points retrieved by the image forming apparatus will be changed, and the management server 300 may recognize that the image forming apparatus 200-1 has moved, accordingly. In addition, the management server 300 may find another image forming apparatus 200-2 that is nearest neighbor to the image forming apparatus 200-1 by comparing the information of the access points retrieved by the image forming apparatus 200-1 having a newly changed position with the information of the access points of another image forming apparatus, and may update position information of the image forming apparatus 200-1 having the changed position by using the position of another found image forming apparatus 200-2. Position managing information stored in the management server 300 as described above may be the same as those shown in FIG. 16.

Figure 17:
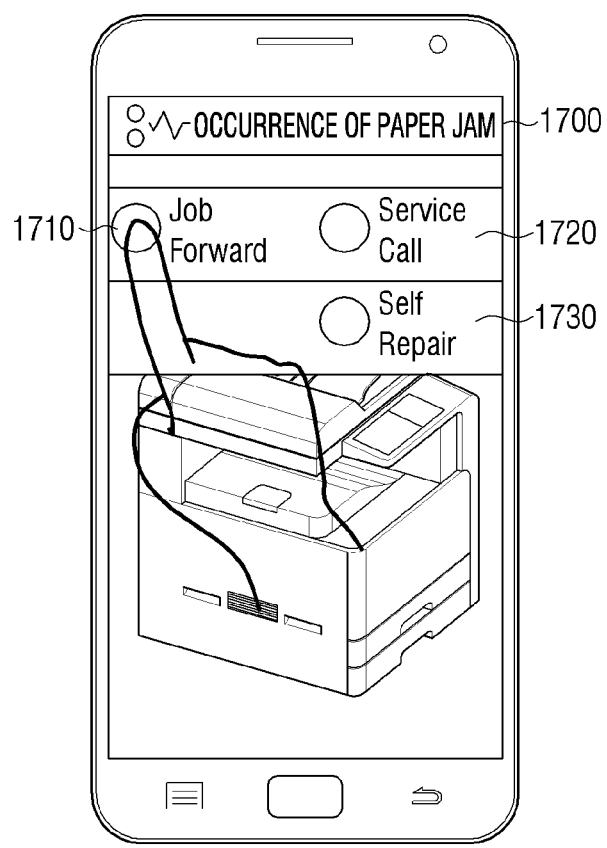
FIGS. 17 and 18 are diagrams showing various examples of a user interface window which may be displayed on an electronic apparatus when error has occurred in an image forming apparatus.
Figure 18:
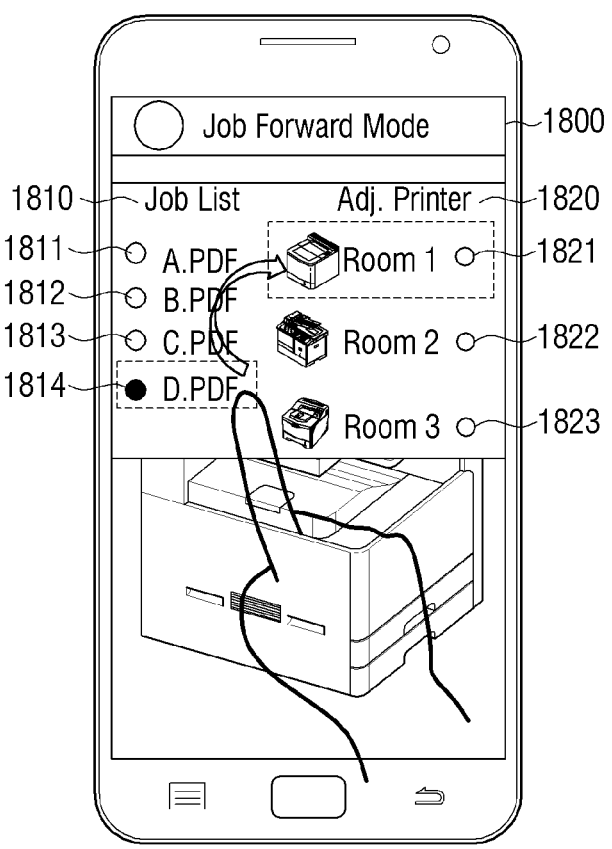

FIGS. 17 and 18 are diagrams showing various examples of the user interface window which may be displayed on the electronic apparatus when error has occurred in the first image forming apparatus.

Referring to FIG. 17, the user interface window 1700 displays that the error has occurred in the image forming apparatus by which the printing job is performing.

In addition, the user interface window 1700 displays options 1710, 1720, and 1730 that the user may perform for the image forming apparatus in which the error has occurred.

A first option 1710 is an option in which the printing job being worked in the corresponding image forming apparatus is transferred to another apparatus. If the first option 1710 is selected, the user interface window as shown in FIG. 18 may be displayed.

In addition, a second option 1720 is an option in which a repair of the image forming apparatus is requested to a service engineer. If the second option 1720 is selected, a telephone call may be connected to a pre-stored telephone number or a message may be transmitted to the pre-stored telephone number.

In addition, a third option 1730 is an option allowing the user to perform the repair by oneself. If the third option 1730 is selected, a repair manual corresponding to the errors may be provided to the user.

Referring to FIG. 18, a user interface window 1800 corresponding to the selection of first option 1710 includes a first region 1810 on which a job (for example A.pdf 1811, B.pdf 1812, C.pdf 1813, D.pdf 1814) being pending in the image forming apparatus having the error occurred therein is displayed and a second region 1820 on which information on another image forming apparatus that is neighbor to the image forming apparatus having the error occurred therein is displayed. Another image forming apparatus (adjacent printer) displayed on the second region 1820 may be an apparatus which is retrieved by the corresponding image forming apparatus and may be an apparatus which is retrieved by the management server 300 and provided to the image forming apparatus having the error occurred therein.

Accordingly, the user may drag and drop his or her job (for example, 1814) from among jobs 1811, 1812, 1813, 1814 displayed on the first region 1810 to one image forming apparatus (for example, 1821) from among other image forming apparatuses 1821, 1822, 1823 displayed on the second region 1820 so that his or her job can be printed in other image forming apparatus.

Figure 19:
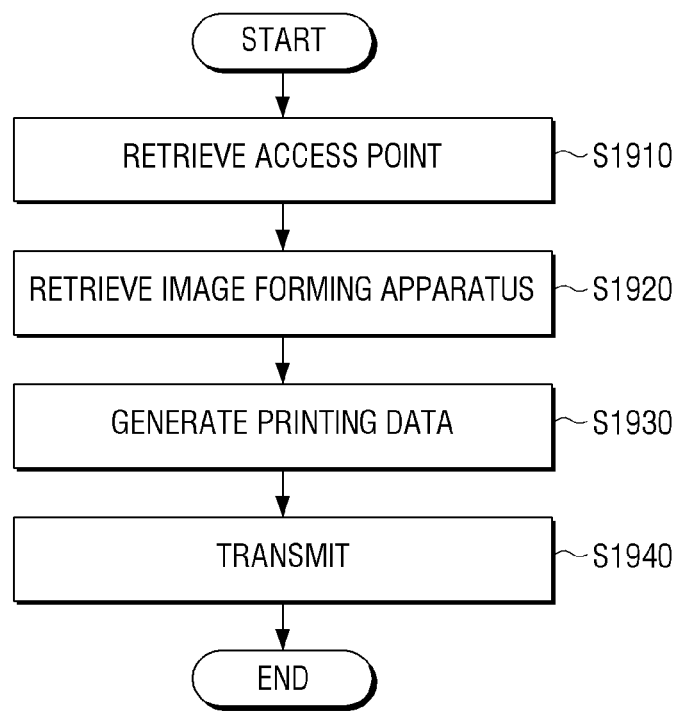
FIG. 19 is a flow chart for describing a method for controlling a printing in an electronic apparatus according to an exemplary embodiment.

FIG. 19 is a flow chart for describing a method for controlling a printing in an electronic apparatus according to an exemplary embodiment.

Referring to FIG. 19, first, if the printing instructions for the document are input, the electronic apparatus 100 retrieves accessible access points (S1910). Specifically, the electronic apparatus 100 may retrieve the accessible access points (specifically, service set identifier (SSID) and basic set identifier (BSID)) and received signal strength indicator (RSSI) with each access point.

In addition, the electronic apparatus 100 retrieves the image forming apparatus that is nearest neighbor to the electronic apparatus 100 among the plurality of image forming apparatuses based on the retrieved access points (S1920). Specifically, the electronic apparatus may select the image forming apparatus that is nearest neighbor to the electronic apparatus by receiving the information of the neighbor access points from each of the plurality of image forming apparatuses and comparing the received information of the plurality of neighbor access points with the retrieved access points. Alternatively, the electronic apparatus may select the image forming apparatus that is nearest neighbor to the electronic apparatus by receiving the information of the neighbor access points of each of the plurality of image forming apparatuses from the management server and comparing the received information of the plurality of neighbor access points with the retrieved access points. Alternatively, the electronic apparatus may select the image forming apparatus that is nearest neighbor to the electronic apparatus by transmitting the retrieved access points to 'the management server having the information of the neighbor access points of each of the plurality of image forming apparatuses' and receiving the information of the image forming apparatus that is nearest neighbor to the electronic apparatus from the management server.

In addition, the electronic apparatus generates the printing data for the document (S1930). If the direct printing in which the image forming apparatuses may print a file itself upon being implemented is supported, the document itself may be used as the printing data without a separate converting operation.

In addition, the electronic apparatus 100 transmits the generated printing data to the previously retrieved nearest neighbor image forming apparatus (S1940).

Therefore, since the method for controlling the printing of the electronic apparatus according to the present exemplary embodiment may perform the printing job by using the image forming apparatus that is nearest neighbor thereto, the user may easily perform the printing job even under a new network environment. The method for controlling the printing as shown in FIG. 19 may be executed on the electronic apparatus having the configuration as shown in FIG. 2 and may also be executed on an electronic apparatus having other configurations.

In addition, the method for controlling the printing of the electronic apparatus as described above may be implemented in at least one execution program for executing the method for controlling the printing as described above, in which the execution program may be stored in a non-transitory computer readable medium.

The non-transitory computer readable medium does not refer to a medium storing data for a short period such as a register, a cache memory, or the like, but refers to a machine-readable medium semi-permanently storing the data. Specifically, various applications or programs described above may be stored and provided in the non-transitory computer readable medium such as a compact disc (CD), a digital versatile disk (DVD), a hard disk, a Blu-ray disk, a universal serial memory (USB), a memory card, a read-only memory (ROM), or the like.

Figure 20:
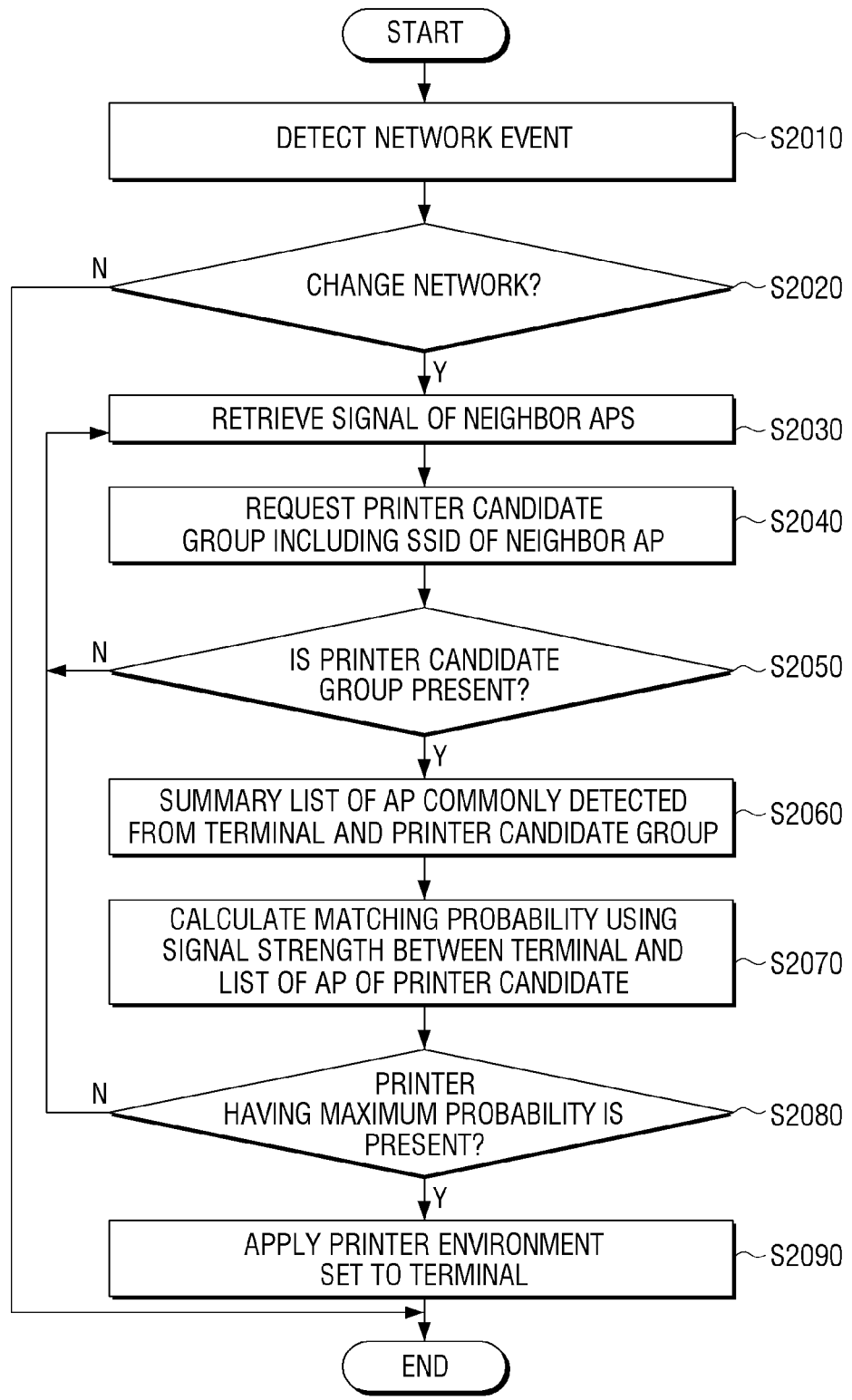
FIG. 20 is a flow chart for describing a retrieving step of FIG. 19 in detail.

FIG. 20 is a flow chart for describing a retrieving step of FIG. 19 in detail.

Referring to FIG. 20, it is detected that the electronic apparatus 100 is connected to a new network (S2010).

As a result of the detection, if the electronic apparatus 100 is connected to the new network (Y of S2020), the access point accessible to the electronic apparatus 100 is retrieved (S2030).

In addition, the electronic apparatus 100 requests a printer candidate group including the SSID of the neighbor access point to the management server 300 (S2040), summaries (S2060) a list of APs commonly detected from the electronic apparatus and the printer candidate group if the printer candidate group is present (Y of S2050), and calculates matching probability of each printer candidate group (S2070). Since this is described above with reference to FIG. 8, an overlapped description will be omitted.

In addition, the image forming apparatus having the highest matching probability may be determined as the default image forming apparatus (S2080 and S2090). If the printer having the maximum probability is present, the printer environment set is applied to the terminal.

Figure 21:
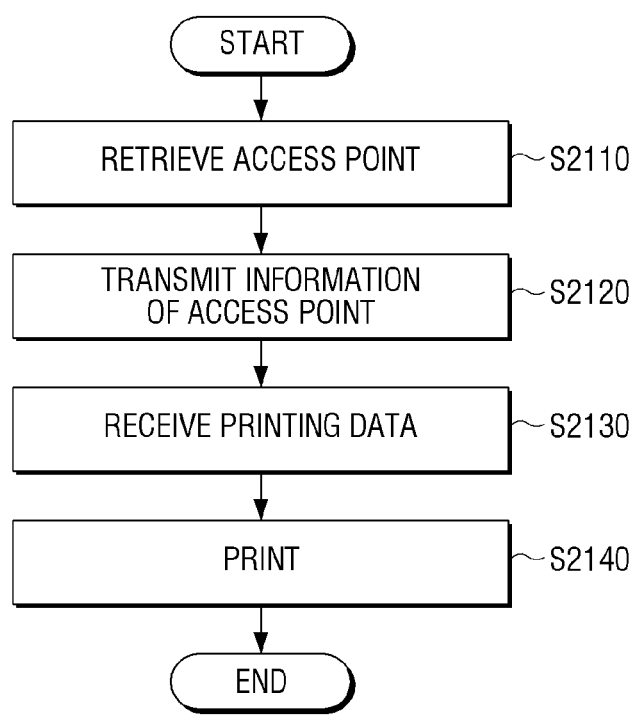
FIG. 21 is a flow chart for describing a method for controlling a printing in an image forming apparatus according to an exemplary embodiment.

FIG. 21 is a flow chart for describing a method for controlling a printing in an image forming apparatus according to an exemplary embodiment.

Referring to FIG. 21, first, the image forming apparatus 200 retrieves the accessible access points (S2110). Specifically, the image forming apparatus 200 may retrieve the accessible access points (specifically, service set identifier (SSID) and basic set identifier (BSID)) and received signal strength indicator (RSSI) with each access point.

In addition, the image forming apparatus 200 provides the information on the retrieved access points to the management server 300 or the electronic apparatus (S2120).

Next, if the image forming apparatus 200 is determined as the image forming apparatus that is nearest neighbor to the electronic apparatus and receives the printing data (S2130), it prints the received printing data (S2140).

Therefore, since the method for controlling the printing of the image forming apparatus according to the present exemplary embodiment provides the information of an own access point to another apparatus, it may allow the image forming apparatus that is nearest neighbor to the electronic apparatus to be selected. The method for controlling the printing as shown in FIG. 21 may be executed on the image forming apparatus having the configuration as shown in FIG. 3 and may also be executed on an image forming apparatus having other configurations.

In addition, the method for controlling the printing of the image forming apparatus as described above may be implemented in at least one execution program for executing the method for controlling the printing as described above, in which the execution program may be stored in a non-transitory computer readable medium.

Figure 22:
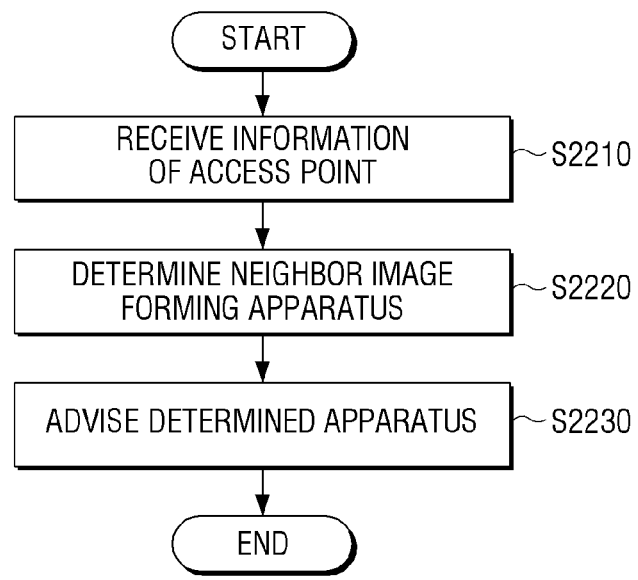
FIG. 22 is a flow chart for describing a method for controlling a printing in a management server according to an exemplary embodiment.

FIG. 22 is a flow chart for describing a method for controlling a printing in a management server according to an exemplary embodiment.

First, the management server receives the information of the access points from the image forming apparatus and the electronic apparatus (S2210). The information of the access points may be service set identifier (SSID), basic set identifier (BSID), and received signal strength indicator (RSSI).

In addition, the management server may select the image forming apparatus that is nearest neighbor to the electronic apparatus by comparing the retrieved access points of the electronic apparatus and each of the plurality of image forming apparatuses (S2220).

In addition, the management server 300 may advise the electronic apparatus of the information on the selected nearest neighbor image forming apparatus (S2230). In an embodiment, address information of the corresponding image forming apparatus may be simultaneously transmitted, and if a printer driver for the corresponding image forming apparatus is not installed in the corresponding electronic apparatus, the printer driver corresponding to the corresponding image forming apparatus may be simultaneously transmitted.

Therefore, since the method for controlling the printing according to the present exemplary embodiment may provide information determining or capable of determining the image forming apparatus that is nearest neighbor to the electronic apparatus, the user may easily perform the printing job even under a new network environment. The method for controlling the printing as shown in FIG. 22 may be executed on the management server having the configuration as shown in FIG. 4 and may also be executed on a management server having other configurations.

In addition, the method for controlling the printing as described above may be implemented in at least one executable program for executing the method for controlling the printing as described above, in which the at least one executable program may be stored in a non-transitory computer readable medium.

Therefore, the respective blocks in one or more exemplary embodiments may be embodied as a computer recordable code on a computer readable recording medium. The non-transitory computer readable recording medium may be a device capable of storing data that is readable by a computer system.

Processes, functions, methods, and/or software in apparatuses described herein may be recorded, stored, or fixed in one or more non-transitory computer-readable media (computer readable storage (recording) media) that includes program instructions (computer readable instructions) to be implemented by a computer to cause one or more processors to execute (perform or implement) the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors. The described hardware devices may be configured to act as one or more software modules that are recorded, stored, or fixed in one or more non-transitory computer-readable media, in order to perform the operations and methods described above, or vice versa. In addition, a non-transitory computer-readable medium may be distributed among computer systems connected through a network and program instructions may be stored and executed in a decentralized manner. In addition, the computer-readable media may also be embodied in at least one application specific integrated circuit (ASIC) or Field Programmable Gate Array (FPGA).

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. An electronic apparatus accessible to a plurality of image forming apparatuses, the electronic apparatus comprising:
   a communications interface to periodically retrieve accessible access points and periodically receive information of neighbor access points of each of the plurality of image forming apparatuses, the information of the neighbor access points of each of the plurality of the image forming apparatuses being transmitted from the plurality of image forming apparatuses;
   a storage device to store the information of the retrieve accessible access points and the received information of the neighbor access points of each of the plurality of the image forming apparatuses; and
   a processor to detect whether or not the electronic apparatus is moved by comparing the stored information of the retrieve accessible access points and the neighbor access points of each of the plurality of image forming apparatuses with the information of the retrieve accessible access points and the received information of the neighbor access points of each of the plurality of image forming apparatuses,
   wherein in response to detecting that the electronic apparatus is moved, the processor selects an image forming apparatus that is nearest neighbor to the electronic apparatus among the plurality of image forming apparatuses by comparing each of the received information of the plurality of neighbor access points with the retrieved access points,
   generates printing data for a document, and
   controls the communications interface to transmit the generated printing data to the selected image forming apparatus.

2. The electronic apparatus as claimed in claim 1, wherein the communications interface receives the information of the neighbor access points directly from each of the plurality of image forming apparatuses.

3. The electronic apparatus as claimed in claim 2, wherein: the processor calculates proximity between each of the plurality of image forming apparatuses and the electronic apparatus by comparing the received information of the plurality of neighbor access points with the retrieved access points, and
   the electronic apparatus further comprises:
   a display to display proximity between the plurality of image forming apparatuses and the electronic apparatus, and
   a user input to receive a selection for one of the plurality of the displayed image forming apparatuses by a user.

4. The electronic apparatus as claimed in claim 2, wherein the processor selects an image forming apparatus that is nearest neighbor to the electronic apparatus depending on whether or not the retrieved access points for the electronic apparatus are included in the received information of the neighbor access points.

5. The electronic apparatus as claimed in claim 1, wherein the processor selects the image forming apparatus that is nearest neighbor to the electronic apparatus by comparing the retrieved access points of the electronic apparatus and each of the plurality of image forming apparatuses, and received signal strength indicators of the access points with one another.

6. The electronic apparatus as claimed in claim 1, wherein the communications interface receives the information of the neighbor access points of each of the plurality of image forming apparatuses from a management server having the information of the neighbor access points of each of the plurality of image forming apparatuses.

7. The electronic apparatus as claimed in claim 1, wherein the processor transmits the retrieved access points to a management server having the information of the neighbor access points of each of the plurality of image forming apparatuses and the processor receives information of the image forming apparatus that is nearest neighbor to the electronic apparatus from the management server.

8. The electronic apparatus as claimed in claim 7, wherein the processor requests a printer driver to the management server and installs the printer driver if the printer driver corresponding to the selected image forming apparatus is not installed.

9. The electronic apparatus as claimed in claim 1, wherein the communications interface receives at least one of service set identifier (SSID), basic set identifier (BSID), and received signal strength indicator (RSSI) of each of the accessible access points.

10. The electronic apparatus as claimed in claim 1, further comprising:
    a display to display a list of other image forming apparatuses that are neighbors to the selected image forming apparatus if an error for the selected image forming apparatus is detected, and
    a user input unit to receive a selection for one of other displayed image forming apparatuses by a user,
    wherein the communications interface transmits controlling instructions allowing printing data which is pre-transmitted to a newly selected another image forming apparatus to be transmitted to the selected image forming apparatus.

11. A management server connected to an electronic apparatus and connected to a plurality of image forming apparatuses, the management server comprising:
    a communications interface to periodically receive information of accessible access points of the electronic apparatus and each of the plurality of image forming apparatuses;
    a storage device to store the received information of the accessible access points of each of the plurality of image forming apparatuses; and
    a processor to detect whether or not an image forming apparatus of each of the plurality of image forming apparatuses is moved by comparing the stored received information of the accessible access points with received information of neighbor accessible access points of each of the plurality of image forming apparatuses,
    wherein in response to detecting that the image forming apparatus of the plurality of image forming apparatuses is moved, the processor
    selects another image forming apparatus that is nearest neighbor to the electronic apparatus among the plurality of image forming apparatuses by comparing the received information of each of the plurality of the neighbor access points of the plurality of image forming apparatuses with the received stored access points of the electronic apparatus, and
    controls the communications interface to transmit information on the selected another image forming apparatus to the electronic apparatus, and wherein the plurality of the neighbor access points are transmitted from the plurality of image forming apparatuses.

12. The management server as claimed in claim 11, wherein the processor selects the another image forming apparatus that is nearest neighbor to the electronic apparatus depending on whether or not the access points of the electronic apparatus are included in the information of the accessible access points of the image forming apparatus.

13. The management server as claimed in claim 11, wherein the processor selects the image forming apparatus that is nearest neighbor to the electronic apparatus by comparing retrieved access points of the electronic apparatus and each of the plurality of image forming apparatuses, and received signal strength indicators of the retrieved access points with one another.

14. The management server as claimed in claim 11, further comprising:
a storage to store a printer driver corresponding to each of the plurality of image forming apparatuses,
wherein the processor transmits the printer driver corresponding to the selected image forming apparatus together with the information of accessible access points.

15. An image forming system comprising:
an electronic apparatus to generate printing data for a document;
a plurality of image forming apparatuses to perform a printing job using the generated printing data for the document; and
a storage device to store information of accessible access points of each of the plurality of image forming apparatuses and the electronic apparatus; and
a management server to detect whether or not the electronic apparatus or the plurality of image forming apparatuses is moved by periodically collecting the information of the accessible access points for the electronic apparatus and the plurality of image forming apparatuses, and wherein in response to detecting that the electronic apparatus or the plurality of image forming apparatuses is moved, determine one image forming apparatus that is nearest neighbor to the electronic apparatus among the plurality of image forming apparatuses by comparing the information of the stored accessible access points for the electronic apparatus with the information of the stored accessible access points for each of the plurality of image forming apparatuses and allowing the generated printing data to be printed in the determined image forming apparatus,
wherein the plurality of image forming apparatuses transmit the information of the accessible access points of each of the plurality of image forming apparatuses to at least one of the electronic apparatus and the management server.

16. A method for controlling a printing job of an electronic apparatus connected to a plurality of image forming apparatuses, the method comprising:
periodically, by a communications interface of the electronic apparatus, retrieving accessible access points;
storing, in a storage device, information of the retrieved accessible access points and the received information of the neighbor access points of each of the plurality of the image forming apparatuses;
detecting, by a processor, whether or not the electronic apparatus is moved by comparing the stored information of the retrieved accessible access points stored in the electronic apparatus with the information of received neighbor accessible access points;
in response to detecting that the electronic apparatus is moved, selecting one image forming apparatus that is nearest neighbor to the electronic apparatus among the plurality of image forming apparatuses by comparing the retrieved stored access points with the information of the received neighbor access points of the plurality of image forming apparatuses, the information of the received neighbor access points of the plurality of image forming apparatuses being transmitted from the plurality of image forming apparatuses;
generating printing data for a document; and
transmitting the generated printing data to the selected image forming apparatus.

17. The method for controlling the printing as claimed in claim 16, wherein in the selecting operation, the image forming apparatus that is nearest neighbor to the electronic apparatus is selected depending on whether or not the retrieved access points for the electronic apparatus are included in the information of the neighbor access points.

18. The method for controlling the printing as claimed in claim 16, wherein in the selecting operation, the image forming apparatus that is nearest neighbor to the electronic apparatus is selected by comparing the retrieved access points of the electronic apparatus and each of the plurality of image forming apparatuses, and received signal strength indicators of the access points with one another.

19. A method for controlling a printing job of a management server connected to an electronic apparatus and a plurality of image forming apparatuses, the method comprising:
periodically, by a communications interface, receiving information of accessible access points of the electronic apparatus and each of the plurality of image forming apparatuses;
storing, by a storage device, the received information of accessible access points of the electronic apparatus and each of the plurality of image forming apparatuses;
detecting whether or not the electronic apparatus or the plurality of image forming apparatuses is moved by comparing the stored received information of accessible access points of the electronic apparatus and each of the plurality of image forming apparatuses with the received neighbor information of accessible access points of the electronic apparatus and each of the plurality of image forming apparatuses;
in response to detecting that the electronic apparatus or the plurality of image forming apparatuses is moved, selecting an image forming apparatus that is nearest neighbor to the electronic apparatus among the plurality of image forming apparatuses by comparing the stored received accessible access points for the electronic apparatus with the received neighbor accessible access points for each of the plurality of image forming apparatuses; and
transmitting the stored received accessible access points information on the selected image forming apparatus to the electronic apparatus,
wherein the stored received accessible access points information of each of the plurality of image forming apparatuses is transmitted from the plurality of image forming apparatuses.

* * * * *

UNITED STATES PATENT AND TRADEMARK OFFICE
CERTIFICATE OF CORRECTION

PATENT NO. : 9,594,532 B2  
APPLICATION NO. : 14/477359  
DATED : March 14, 2017  
INVENTOR(S) : Hye-soo Kim Page 1 of 1

It is certified that error appears in the above-identified patent and that said Letters Patent is hereby corrected as shown below:

In the Claims

Column 27, Line 61, Delete "claim 1" and insert -- claim 2 --, therefore.

Column 30, Line 45, after "with" delete "the".

Signed and Sealed this  
Twenty-fifth Day of July, 2017

Joseph Matal  
*Performing the Functions and Duties of the*  
*Under Secretary of Commerce for Intellectual Property and*  
*Director of the United States Patent and Trademark Office*